(12) United States Patent
Hayakawa et al.

(10) Patent No.: US 11,544,192 B2
(45) Date of Patent: Jan. 3, 2023

(54) SEMICONDUCTOR DEVICE, CONTROL SYSTEM, AND CONTROL METHOD OF SEMICONDUCTOR DEVICE

(71) Applicant: RENESAS ELECTRONICS CORPORATION, Tokyo (JP)

(72) Inventors: Yuki Hayakawa, Tokyo (JP); Toshiyuki Kaya, Tokyo (JP); Shinichi Shibahara, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 75 days.

(21) Appl. No.: 17/112,702

(22) Filed: Dec. 4, 2020

(65) Prior Publication Data

US 2021/0089453 A1     Mar. 25, 2021

Related U.S. Application Data

(63) Continuation of application No. 16/446,195, filed on Jun. 19, 2019, now Pat. No. 10,860,486.

(30) Foreign Application Priority Data

Jun. 28, 2018   (JP) .............................. JP2018-123381

(51) Int. Cl.
*G06F 11/16*          (2006.01)
*G06F 12/06*          (2006.01)
(Continued)

(52) U.S. Cl.
CPC .......... *G06F 12/0815* (2013.01); *G06F 11/16* (2013.01); *G06F 11/167* (2013.01);
(Continued)

(58) Field of Classification Search
CPC .... G06F 12/0815; G06F 11/16; G06F 11/167; G06F 11/1666; G06F 11/1675; G06F 12/063; G06F 12/084; G06F 12/0842
See application file for complete search history.

(56) References Cited

U.S. PATENT DOCUMENTS 5,652,859 A * 7/1997 Mulla ................. G06F 12/0831
                                                  711/146
5,748,937 A * 5/1998 Abramson ............ G06F 9/3834
                                                  712/218
(Continued)

FOREIGN PATENT DOCUMENTS

EP       2 515 238 A1   10/2012
JP       2014-056396 A   3/2014

OTHER PUBLICATIONS

A archive.org snapshot taken Jan. 2, 2016 of https://www.britannica.com/technology/register-electric-circuit that describes Electric circuit Registers (Year: 2016).*
(Continued)

*Primary Examiner* — William E. Baughman
*Assistant Examiner* — Janice M. Girouard
(74) *Attorney, Agent, or Firm* — McDermott Will & Emery LLP

(57) ABSTRACT

A semiconductor device includes first and second CPUs, first and second SPUs for controlling a snoop operation, a controller supporting ASIL D of a functional safety standard and a memory. The controller sets permission of the snoop operation to the first and second SPUs when a software lock-step is not performed. The controller sets prohibition of the snoop operation to the first and second SPUs when the software lock-step is performed. The first CPU executes a first software for the software lock-step, and writes an execution result in a first area for the memory. The second CPU executes a second software for the software lock-step,
(Continued)

and writes an execution result in a second area of the memory. The execution result written in the first area is compared with the execution result written in the second area.

5 Claims, 29 Drawing Sheets

(51) Int. Cl.
*G06F 12/084* (2016.01)
*G06F 12/0842* (2016.01)
*G06F 12/0815* (2016.01)

(52) U.S. Cl.
CPC ...... *G06F 11/1666* (2013.01); *G06F 11/1675* (2013.01); *G06F 12/063* (2013.01); *G06F 12/084* (2013.01); *G06F 12/0842* (2013.01)

(56) References Cited

U.S. PATENT DOCUMENTS 9,058,272 B1* 6/2015 O'Bleness .......... G06F 12/0831
2006/0143513 A1* 6/2006 Hillman .............. G06F 11/1658
714/13

OTHER PUBLICATIONS

U.S. PTO Notice of Allowance issued in related parent U.S. Appl. No. 16/446,195, dated Aug. 17, 2020.
Entire U.S. PTO issued in related parent U.S. Appl. No. 16/446,195, filed Jun. 19, 2019.
Extended European Search Report issued in corresponding European Patent Application No. 19182508.2-1221, dated Dec. 19, 2019.

* cited by examiner

SEMICONDUCTOR DEVICE, CONTROL SYSTEM, AND CONTROL METHOD OF SEMICONDUCTOR DEVICE

CROSS-REFERENCE TO RELATED APPLICATIONS

This is a Continuation of U.S. patent application Ser. No. 16/446,195 filed on Jun. 19, 2019, which claims the benefit of Japanese Patent Application No. 2018-123381 filed on Jun. 28, 2018 including the specification, drawings and abstract is incorporated herein by reference in their entirety.

BACKGROUND

The present disclosure relates to a semiconductor device, and more particularly relates to a lock-step in the semiconductor device.

Recently, a higher level of functional safety is required. Automotive Safety Integrity Level (ASIL) is defined as the functional safety of ISO26262. The functional safety levels are defined as Quality Management (QM), ASIL A, ASIL B, ASIL C, ASIL D in order low safety level. At the ASIL B level, more than 90% of faults occurring during operation must be detected, and at the ASIL D level, more than 99% of faults must be detected. For example, an in-vehicle electronic system that is compliant with the ISO26262, the ASIL D is required. In particular, the ASIL D level of the functional safety requires a higher level of fault detection performance, called a lock-step, that compares and matches results obtained from two or more hardware-based operations.

Concerning the lock-step, for example, Japanese unexamined Patent Application publication No. 2014-56396 discloses "an electronic control device that determines whether or not a plurality of processor cores is normally executing the same program and that secures an opportunity to perform a memory check".

SUMMARY

According to a technique disclosed in Japanese unexamined Patent Application publication No. 2014-56396, it is possible to switch between a mode of a dual-core lock-step in which the functional safety level is high but only one operation is possible, and a mode in which the functional safety level is normal, but two cores can be operated respectively. However, when switching to the mode of the dual-core lock-step, resetting is required to synchronize the two cores, which may result in a process stop period of about several milliseconds, which may deteriorate performance. Accordingly, there is a need for a technique that does not deteriorate performance while maintaining a functional safety level.

The present disclosure has been made to solve the above-mentioned problem, and in one aspect, a semiconductor device which does not deteriorate in performance while maintaining a functional safety level is disclosed. In another aspect, a control system that does not deteriorate performance while maintaining a functional safety level is disclosed. In yet another aspect, a method of controlling a semiconductor device such that performance is not deteriorated while maintaining a functional safety level is disclosed.

A semiconductor device according to one embodiment includes a first processor that includes a first cache and that performs a software lock-step, a second processor that includes a second cache and that performs the software lock-step, a memory that includes a first area, a second area and a third area, a first snoop control circuit that is coupled to the first processor and the memory, and that controls a first snoop operation to the second cache by the first processor, a second snoop control circuit that is coupled to the second processor and the memory, and that controls a second snoop operation to the first cache by the second processor, and a controller that controls the first and second snoop control circuits. The controller permits the first snoop control circuit and the second snoop control circuit to perform the first snoop operation and the second snoop operation respectively, when the software lock-step is not performed. The controller prohibits the first snoop control circuit and the second snoop control circuit from performing the first snoop operation and the second snoop operation respectively, when the software lock-step is performed. The first processor executes a first software for the software lock-step, and writes a first execution result of the first software in the first area. The second processor executes a second software for the software lock-step, and writes a second execution result of the second software in the second area. The first execution result written in the first area is compared with the second execution result written in the second area.

In some aspects, performance deterioration may be prevented while maintaining a functional safety level of the semiconductor device.

Other objects and new features will be apparent from the descriptions of the present specification and the accompanying drawings.

DETAILED DESCRIPTION

Figure 1:
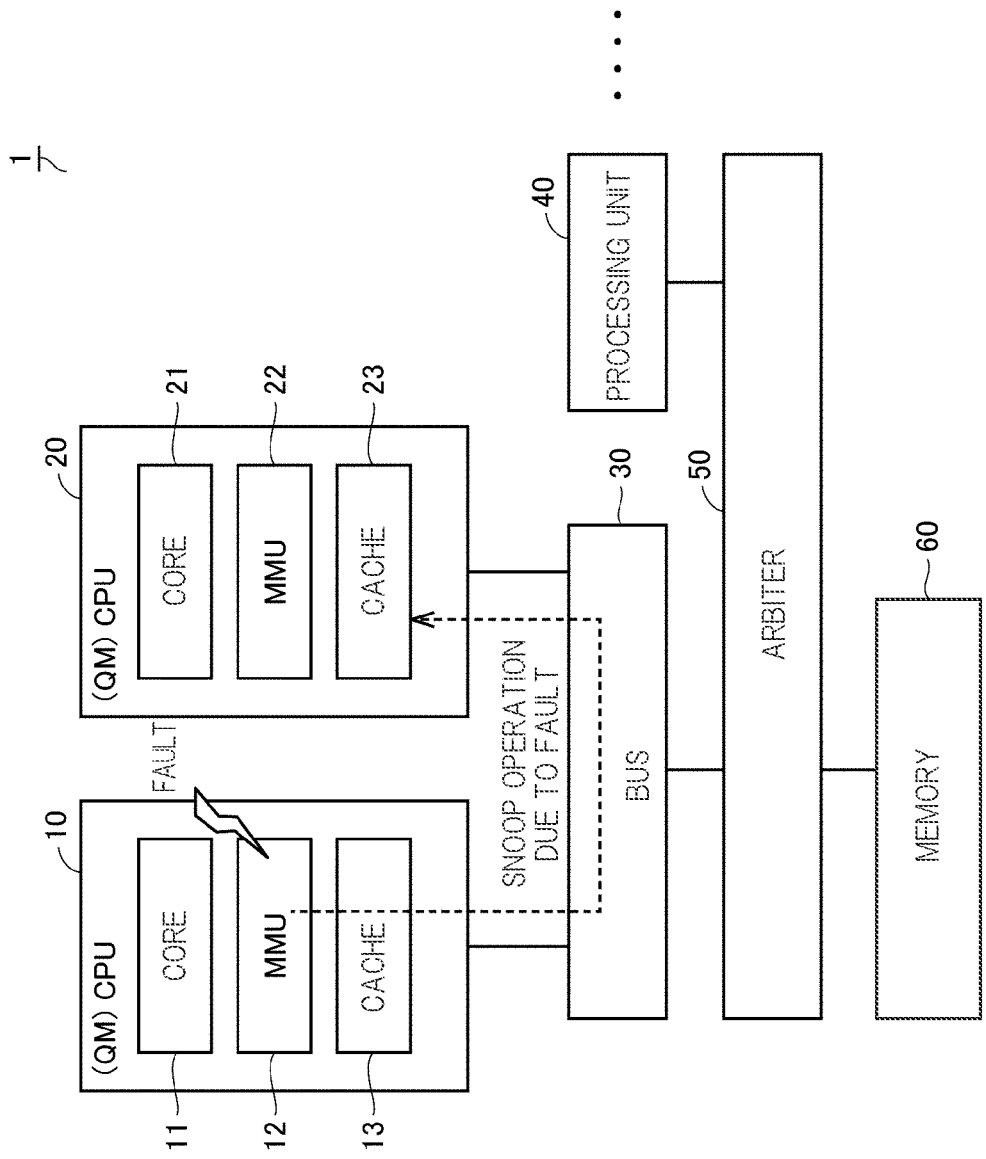
FIG. 1 is a block diagram showing a hardware configuration of a semiconductor device 1.

Embodiments of technical ideas according to the present disclosure will be described below with reference to drawings. In the following description, the same components are denoted by the same reference numerals. Their names and functions are also the same. Therefore, detailed description thereof will not be repeated.

First Embodiment

Referring to FIG. 1, a configuration of a semiconductor device 1 that performs a software lock-step (SWLS) according to one aspect of the semiconductor device 1 will be described. FIG. 1 is a block diagram showing a hardware configuration of the semiconductor device 1. In the present embodiment, the software lock-step refers to a method of executing a program in which a plurality of cores has the same result, and detecting a fault of these cores by confirming that the results are the same by a comparison device other than these cores. More specifically, two cores having a normal functional safety level execute a program on an application unit or on a function unit without synchronizing on a clock cycle unit, and the execution results are compared. At this time, unlike a dual core lock-step in which inputs to the cores are required to be the same in clock cycle units, in the software lock-step according to the present embodiment, an input timing to the cores may be arbitrary, and it is not necessary to synchronize the cores.

The semiconductor device 1 includes Central Processing Units (CPUs) 10 and 20, a bus 30, a processing unit 40, an arbiter 50, and a memory 60. The CPU 10 includes a core 11, a Memory Management Unit (MMU) 12, and a cache 13. The CPU 20 includes a core 21, an MMU 22 and a cache 23.

The CPUs 10 and 20 are connected to the bus 30. The bus 30, the processing unit 40, and the memory 60 are connected to the arbiter 50.

The CPUs 10 and 20, are a normal QM class processor that does not require functional safety to be applied. The CPUs 10 and 20 may store data in the caches 13 and 23. In one aspect, the CPU 20 may have stored data in the cache 23 and not written the data to the memory 60. In such a case, when a processor other than the CPU 20, for example, the CPU 10, wants to handle the data, the CPU 10 needs to perform so-called snoop operation, i.e., processing of accessing the cache 23 of the CPU 20 and reading the data. Since data can be exchanged between the cores 11 and 21 at high speed by performing the snoop operation, performance such as calculation speed can be greatly improved as compared with a case where the snoop operation is not performed.

The cores 11 and 21 include an arithmetic processing circuit. The MMU 12 controls translation of memory addresses, protecting the memory 60 from accesses, and accessing the cache 13. The MMU controls translation of memory addresses, protecting the memory 60 from accesses, and accessing the cache 23.

The bus 30 is a Cache Coherent Interconnect (CCI) and handles accesses to the cache by, for example, the CPU 10. The bus 30 corresponds to ASIL D class (hereinafter, the "ASIL D class" may be referred to as "ASIL D supported" or "ASIL D level" as appropriate, the same applies to other ASIL classes).

The processing unit 40 may be an arithmetic unit having no cache. The processing unit 40 may support either the ASIL B class or the ASIL D class.

The arbiter 50 has a function of protecting addresses and arbitrates accesses to the memory 60 by the CPUs 10 and 20, the bus 30, and the processing unit 40.

The memory 60 is, for example, a Double Data Rate (DDR) memory. In the semiconductor device 1 according to one aspect, in order to prevent a snoop operation between the CPUs 10 and 20, for example, using the MMUs 12 and 22, it can be conceivable to prevent the snoop operation. However, the MMUs 12 and 22 cannot be used to prevent the snoop operation because the MMUs and 22 are themselves the subject of the lock-step. Alternatively, it is also conceivable to configure the CPUs 10 and 20 so as not to be able to perform the snoop operation. In this case, since the snoop operation cannot be performed even when there is no problem even if the snoop operation is performed, the performance of the semiconductor device 1 may be deteriorated, such as processing delay.

In the present embodiment, a fault caused by a bug of software or hardware is referred to as a systematic fault, and a fault of hardware due to cosmic rays or aged deterioration is referred to as a random hardware fault. A CPU that supports ASIL D refers to a CPU that supports ASIL D class in both systematic and random hardware faults alone (without a use of a software lock-step). It is also assumed that the hardware used for the software lock-step supports the ASIL D class in terms of the systematic fault, and it is assumed that the hardware used for the software lock-step does not support the ASIL D class alone in terms of the random hardware fault. For example, if the software lock-step is not performed, the hardware, e.g., CPU, may be a QM class.

When the software lock-step is performed in the semiconductor device 1 shown in FIG. 1, the following problem may occur. More specifically, an unnecessary snoop operation may be initiated due to a fault of the MMU 12 of the CPU 10 and accesses to the cache 23 of the CPU 20 may occur. In this instance, due to the snoop operation, there is a possibility that the fault of the CPU 10 spreads to the CPU20, erroneous calculation results by the CPUs 10 and 20 coincide with each other and the fault of the CPU 10 is not detected, as a result, the ASIL D class cannot be achieved.

In a conventional circuitry, a snoop operation is supposed to be prevented by the MMUs 12 and 22, but the MMU 12 and 22 themselves is the target of the software lock-step, and the snoop operation cannot be prevented. In addition, a method of duplicating the entire CPUs 10 and 20 that support the QM class and that include the MMUs 12 and 22 respectively is also conceivable, but this method may cause a problem that overhead of an area becomes large. Further, in recent years, functional blocks (so-called Intellectual Property (IP)) constituting Large Scale Integrated Circuits (LSIs) such as CPUs, image processing circuits, memories, and the like are often not made in-house but are made outside the company, and the CPUs themselves may not be modified in some cases. In addition, an area of the MMU or the like has been increased due to complexity of protocols, and an addition of the MMU or the like separately impairs a merit of the conventional art and increases latency.

In addition, in ISO26262, interference such as propagation of a fault between classes differing in ASIL must not occur, and non-interference (hereinafter also referred to as Freedom From Interface (FFI)) is required. Since the FFI needs to be considered between the ASIL D class achieved by the software lock-step and the QM class supported by the CPUs 10 and 20 that do not perform the software lock-step, a processor is required to control the CPUs 10 and 20 supporting the QM class, such as a single CPU supporting the ASIL D class.

Figure 2:
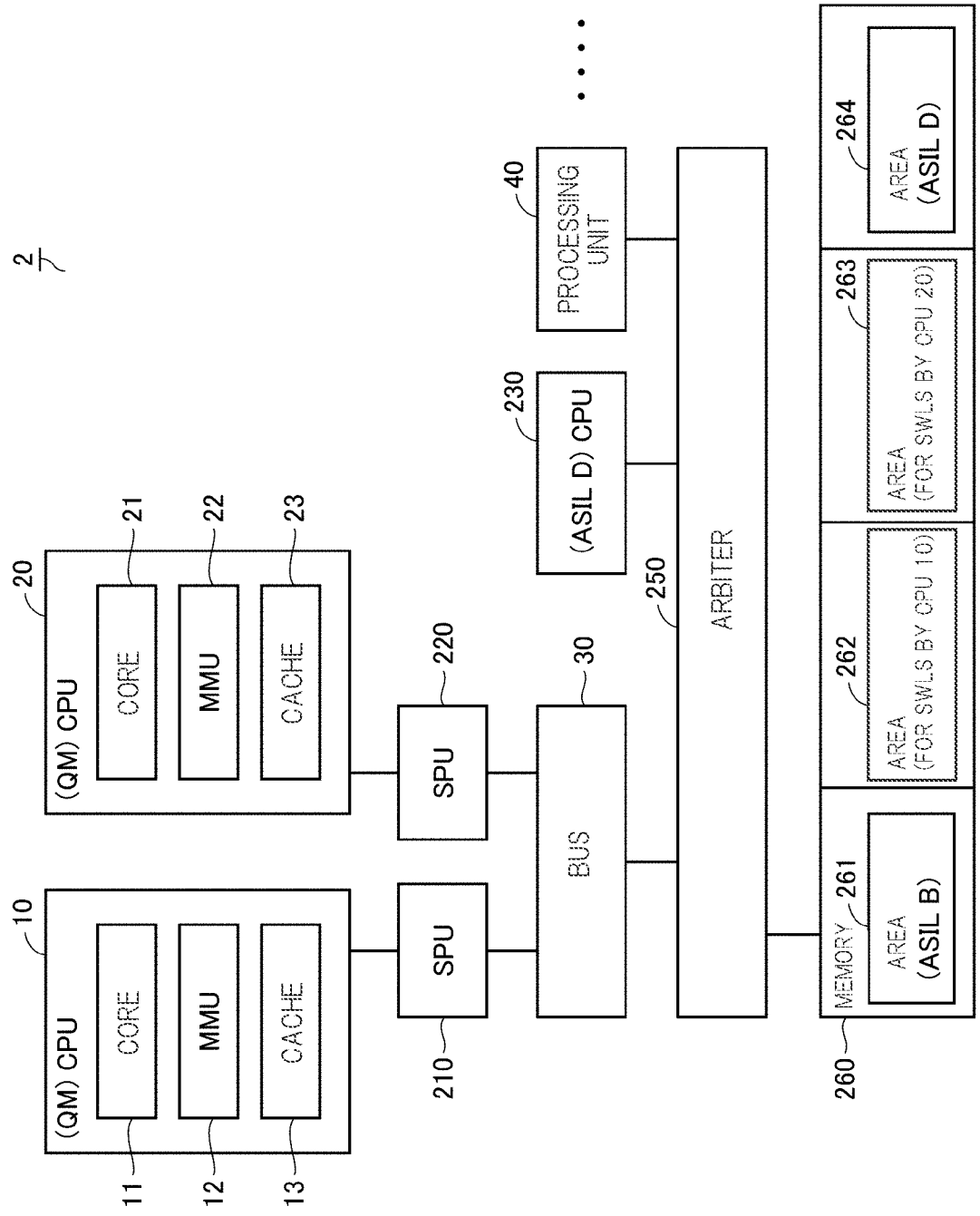
FIG. 2 is a block diagram showing an outline of a configuration of a semiconductor device 2 that can perform a software lock-step.

Thus, a semiconductor device 2 according to one aspect will be described with reference to FIG. 2. FIG. 2 is a block diagram showing an outline of a configuration of the semiconductor device 2 capable of performing the software lock-step. In addition to the configuration of the semiconductor device 1, the semiconductor device 2 includes snoop protection units (SPUs) 210 and 220 and a CPU 230 as circuits for controlling a snoop operation. Further, the semiconductor device 2 includes an arbiter 250 instead of the arbiter 50, and includes a memory 260 instead of the memory 60, with respect to the configuration of the semiconductor device 1.

The SPU 210 controls the snoop operation by CPU 10. The SPU 220 controls the snoop operation by CPU 20. The SPUs 210 and 220 support the ASIL D class respectively.

The CPU 230 is a processor supporting the ASIL D class. In the semiconductor device 2, from the viewpoint of the FFI, control for achieving the ASIL D class needs to be performed by a processor supporting the ASIL D class. Therefore, it is preferable that the CPU 230 supports the ASIL D class.

The arbiter 250 arbitrates accesses to the memory 260. For example, when detecting that an address is abnormal, the arbiter 250 prohibits an access to the address. Alternatively, the arbiter 250 may control accesses across address areas within the memory 260. For example, the arbiter 250 prohibits a processor supporting the ASIL B from writing data to a memory area allocated to a processor supporting the ASIL D.

The memory 260 may be a DDR memory. The memory 260 includes areas 261, 262, 263, and 264. The area 261 is an area for hardware supporting the ASIL B class. The area 262 is an area for the software lock-step by the CPU 10. The area 263 is an area for the software lock-step by the CPU 20. The area 264 is an area for hardware supporting the ASIL D class.

The plurality of areas 262 and 263 for the software lock-step is configured such that each CPUs 10 and 20 can exclusively access the areas. The hardware supporting the ASIL B class, e.g., the processing unit 40, is configured to be inaccessible to the areas 262, 263 and 264 to meet a requirement of the FFI. Also, the target CPUs 10 and 20 for the software lock-step are configured to be inaccessible to the areas 264 used by the hardware supporting the ASIL D class for the similar reason. In terms of functional safety in ASIL D class, it is necessary that parts (for example, a bus) commonly used with other circuits in the semiconductor device 2 support the ASIL D. These parts are supposed to support the ASIL D by a dual-core lock-step, an Error Detection Code (EDC) function, an Error Correction Code (ECC), or the like.

Snoop Protection Unit

Figure 3:
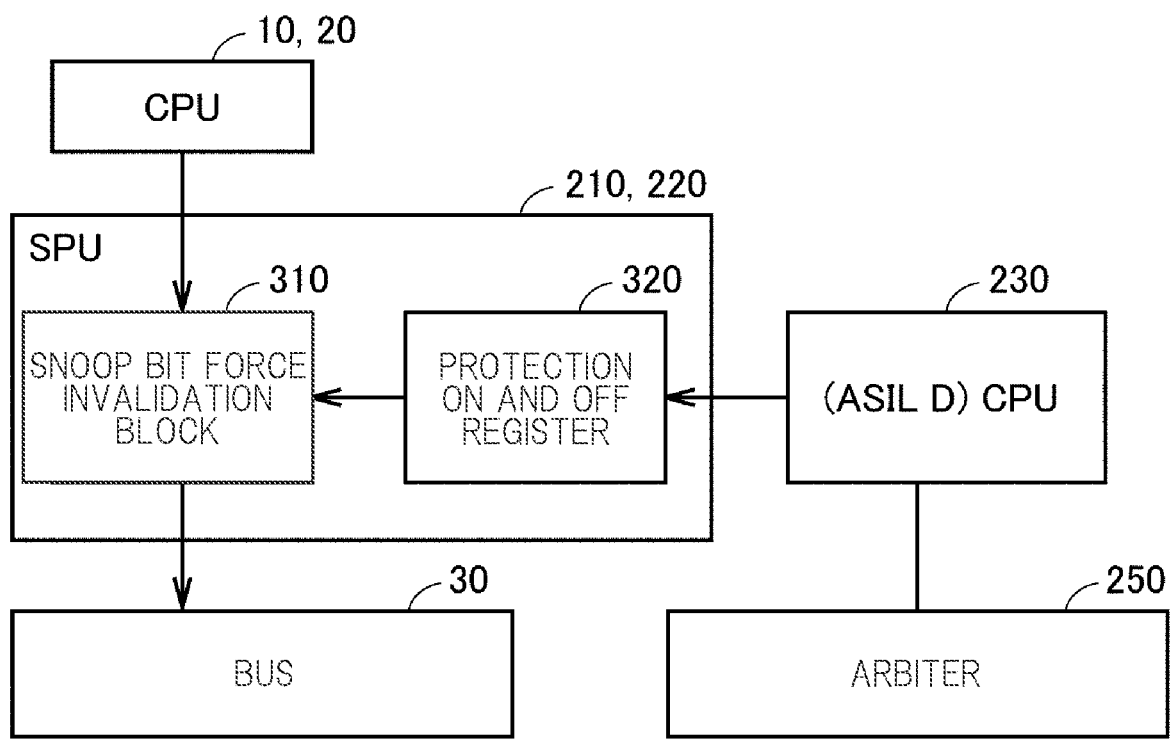
FIG. 3 is a diagram explaining configurations of SPUs 210 and 220 in detail.

Referring to FIG. 3, configurations of the SPUs 210 and 220 according to one aspect will be described. FIG. 3 is a diagram for explaining the configurations of the SPUs 210 and 220 in detail. In one aspect, the SPUs 210 and 220 support the ASIL D class by a mechanism such as a dual-core lock-step.

The SPUs 210 and 220 include a snoop bit force invalidation block 310 and a protection ON and OFF register 320. An output of the CPU 10 may be input to the snoop bit force invalidation block 310 of the SPU 210, and an output of the CPU 20 may be input to the snoop bit force invalidation block 310 of the SPU 220, respectively. An output of the snoop bit force invalidation block 310 may be input to the bus 30.

In one aspect, if the protection ON and OFF register 320 is set to OFF, the SPUs 210 and 220 pass signals from a master, e.g., the CPU 230 supporting the ASIL D class, directly. In another aspect, if the protection ON and OFF register 320 is set to ON, the SPUs 210 and 220 monitor signals indicating a snoop operation included in requests from the CPUs 10 and 20, invalidates the signals, and sends the requests to the bus 30.

In the semiconductor device 2 according to the present embodiment, the SPUs 210 and 220 perform control of snoop operation (access protection of snoop operation). The SPUs 210 and 220 can reduce an increase in latency by not providing a function other than an access protection function of the snoop operation. Further, when the software lock-step is not performed, performance of the semiconductor device 2 can be enhanced by permitting the snoop operation by the SPUs 210 and 220.

Control Steps

Figure 4:
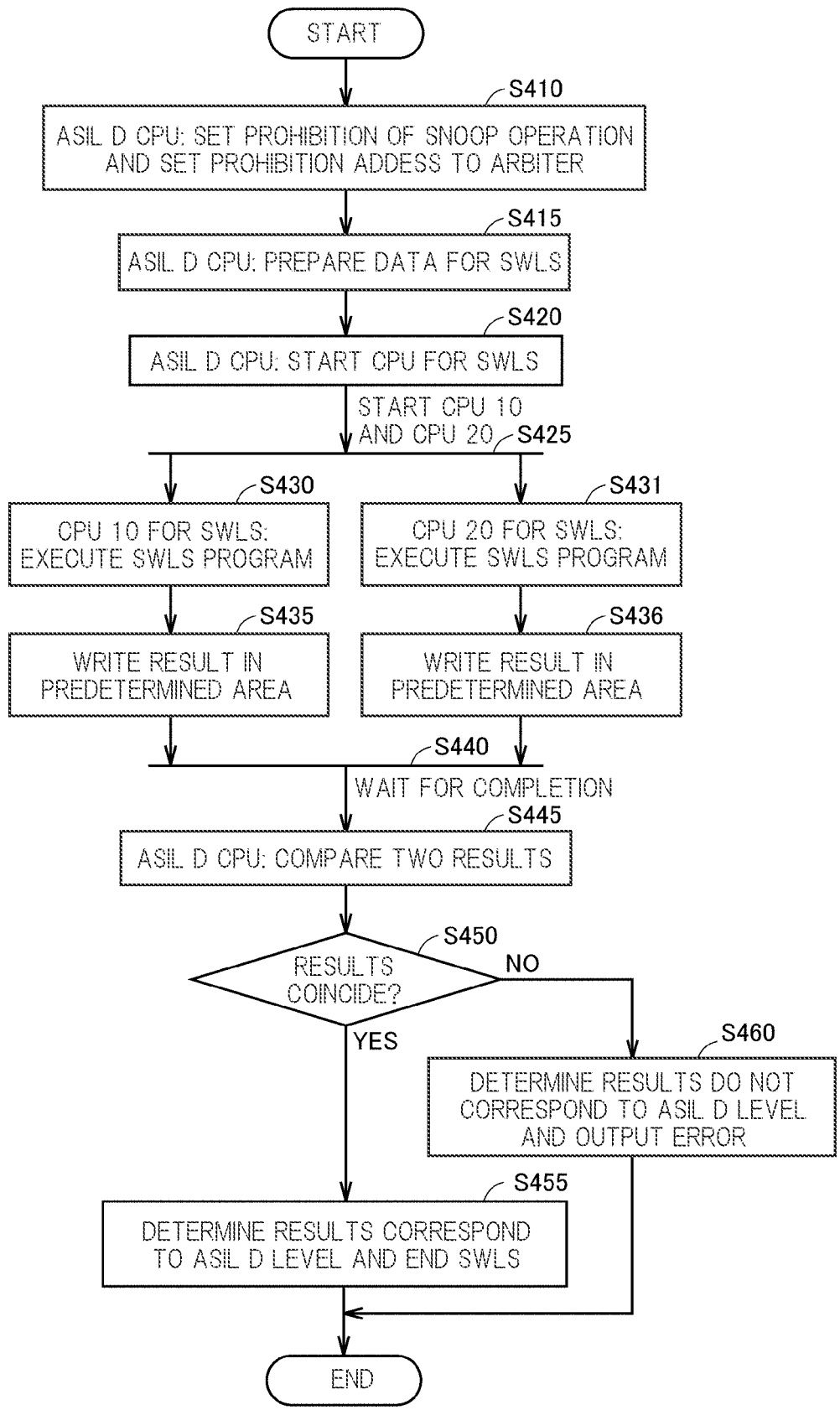
FIG. 4 is a flowchart showing an operation of the semiconductor device 2.
Figure 5:
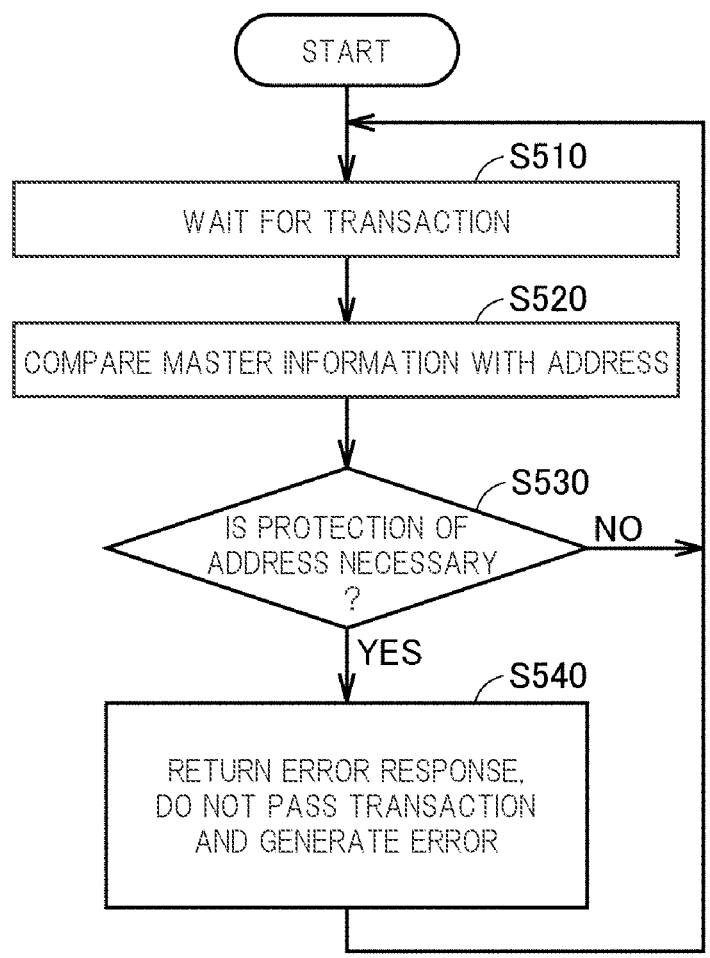
FIG. 5 is a flowchart showing the operation of the semiconductor device 2.
Figure 6:
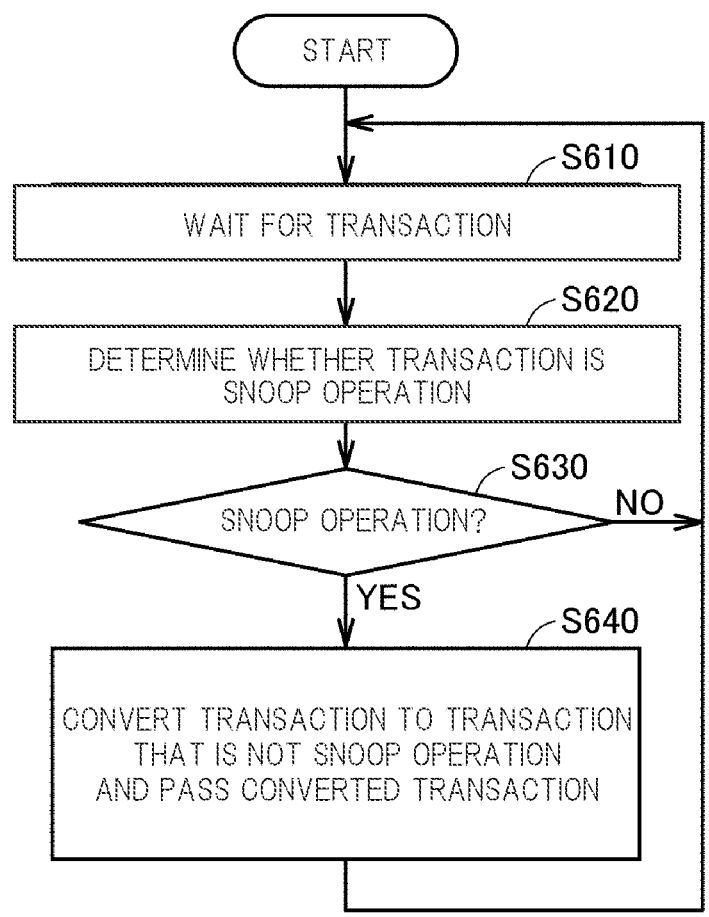
FIG. 6 is a flowchart showing the operation of the semiconductor device 2.

Control steps of the semiconductor device 2 will be described with reference to FIGS. 4 to 6. FIGS. 4 to 6 are flowcharts showing an operation of the semiconductor device 2.

As shown in FIG. 4, in step S410, the CPU 230 supporting the ASIL D class sets prohibition of snoop operation to the SPUs 210 and 220 for the software lock-step. For example, the CPU 230 sets the protection ON and OFF register 320 to OFF. In addition, the CPU 230 sets prohibition addresses to the arbiter 250. For example, the CPU 230 sets addresses so that the CPU 10 can access the area 262, and prohibits accesses by the CPU 20. The CPU 230 sets addresses so that the CPU 20 can access the area 263, and prohibits accesses by the CPU 10. The area 264 is accessible by CPU 230 and is prohibited by the CPUs 10 and 20.

In step S415, the CPU 230 writes programs and data for the software lock-step into the area 264 of the memory 260.

In step S420, the CPU 230 starts the CPUs 10 and 20 that perform the software lock-step based on completion of the writing to the memory 260. For example, the CPU 230 transmits an instruction to start the software lock-step to the CPUs 10 and 20 via the arbiter 250 and the bus 30. In step S425, when detecting that the instruction is received, the CPUs 10 and 20 start.

In step S430, the CPU 10 accesses the memory 260, reads the program and data for the software lock-step, and executes the program. Similarly, in step S431, the CPU 20 accesses the memory 260, reads the program and data, and executes the program. Note that a timing of reading and/or executing in step S430 and a timing of reading and/or executing in step S431 need not be the same, and may be different.

In step S435, the CPU 10 writes results of executing the programs in the area 262 reserved in the memory 260. In step S436, the CPU 20 writes results of executing the programs in the area 263 reserved in the memory 260. Note that a timing of writing in step S435 and a timing of writing in step S436 do not need be the same, and may be different.

In step S440, the CPU 230 waits until detecting that the processes by the CPUs 10 and 20 have been completed. When completing the writing of the execution results, the CPUs 10 and 20 notify the CPU 230 of the completion of the writing of the execution results via the bus 30 and the arbiter 250.

In step S445, when the CPU 230 receives the notification that the writing of the execution results by the CPUs 10 and 20 is completed, the CPU 230 accesses the areas 262 and 263 to read the execution results, and compares the execution result by the CPU 10 with the execution result by the CPU 20. In one aspect, the unit of comparison is, for example, an application unit or a function unit.

In step S450, the CPU 230 determines whether or not these execution results coincide with each other. If the CPU 230 determines that these execution results coincide with each other (YES in step S450), in step S455, the CPU 230 determines that the execution results correspond to the ASIL D level, outputs the execution result to a predetermined destination, and ends the software lock-step. A predetermined processing is executed based on the fact that the execution results coincide with each other. Otherwise (NO in step S450), the CPU 230 determines that the execution results do not correspond to the ASIL D level, and outputs an error.

FIG. 5 is a diagram showing a protection operation by the arbiter 250. In step S510, arbiter 250 waits for a transaction.

At step S520, the arbiter 250 compares information about the transaction and a specified address with master information (information registered by the CPU 230) and an address based on a receipt of the transaction.

In step S530, the arbiter 250 determines whether an address in the memory 260 need to be protected based on setting by the CPU 230. For example, the arbiter 250 may determine whether the CPU 10 is requesting an access to an address that are not authorized for the CPU 10. If the arbiter 250 judges that the address protection is necessary (YES in step S530), the arbiter 250 switches control to step S540. Otherwise (NO in step S530), the arbiter 250 returns control to step S510.

In step S540, the arbiter 250 returns an error response to the CPU 10 and does not pass the transaction. The arbiter 250 may also provide a predetermined error signal to the CPU 230.

FIG. 6 is a flowchart showing a part of a process performed by the SPU 210. Note that the SPU 220 can perform the same process.

At step S610, the SPU 210 waits for a transaction. At step S620, the SPU 210 determines whether the transaction is a snoop operation by the CPU 10. This determination is made, for example, based on a value of a signal (ARSNOOP signal described below) included in the transaction.

If the SPU 210 determines that the transaction is the snoop operation (YES in step S630), then in step S640, the SPU 210 converts the transaction to a transaction that is not the snoop operation, passes the transaction, and transmits the transaction to the bus 30. This may prevent an erroneous snoop operation to the cache of the CPU 20 if the CPU 10 issues a transaction requesting the erroneous snoop operation, since the transaction is converted into a transaction not requesting the snoop operation.

On the other hand, if it is determined that the transaction is not the snoop operation (NO in step S630), the SPU 210 returns control to step S610. The processes are then repeated.

Figure 7:
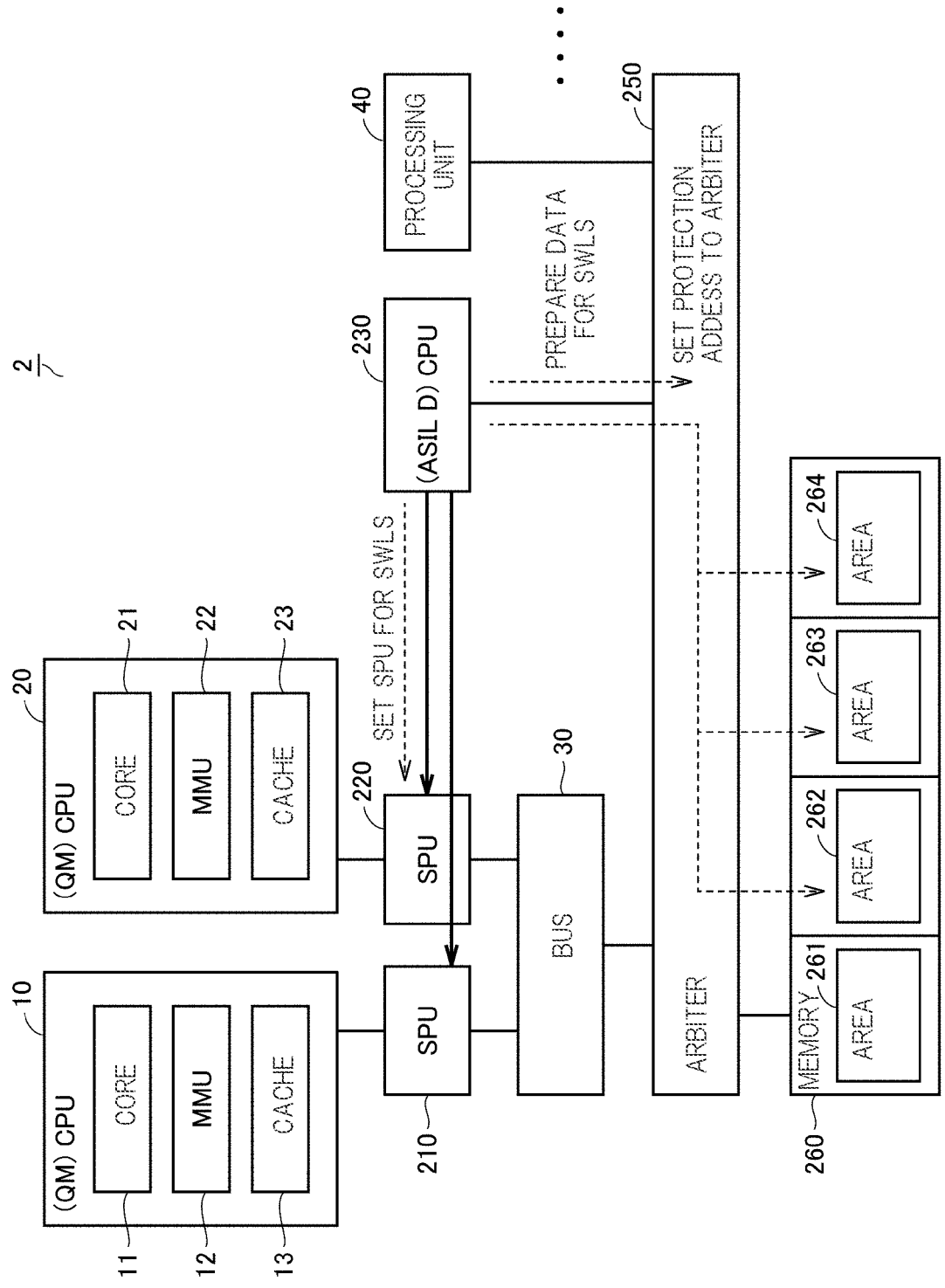
FIG. 7 is a diagram explaining the operation of the semiconductor device 2.

FIGS. 7 to 10 are diagrams for explaining the operation of the semiconductor device 2. Referring to FIG. 7, in one aspect, the CPU 230 prohibits a snoop operation by the SPUs 210 and 220 to perform a software lock-step. For example, the CPU 230 sets a flag indicating that the snoop operation by the SPUs 210 and 220 is prohibited in the snoop bit force invalidation block 310.

The CPU 230 sets a protection address to the arbiter 250. More specifically, the CPU 230 will reserve the areas 262, 263 and 264 in the memory 260 and provide accesses to each area. For example, the area 262 is set to be accessible by the CPUs 10 and 230, and accesses to the area 262 by the CPU 20 are prohibited.

The area 263 is set to be accessible by the CPUs 20 and 230, and accesses to the area 263 by the CPU 10 are prohibited. In the area 264, data writing by the CPU 230 is enabled, and data writing by the CPUs 10 and 20 is prohibited. In addition, the CPU 230 stores programs and data required for the software lock-step in predetermined areas 262 and 263 of the memory 260, respectively. Such a configuration may prevent, in one aspect, erroneous data generated by one processor from being used by another processor, and that a fault caused by making a comparison result the same is not detected.

Figure 8:
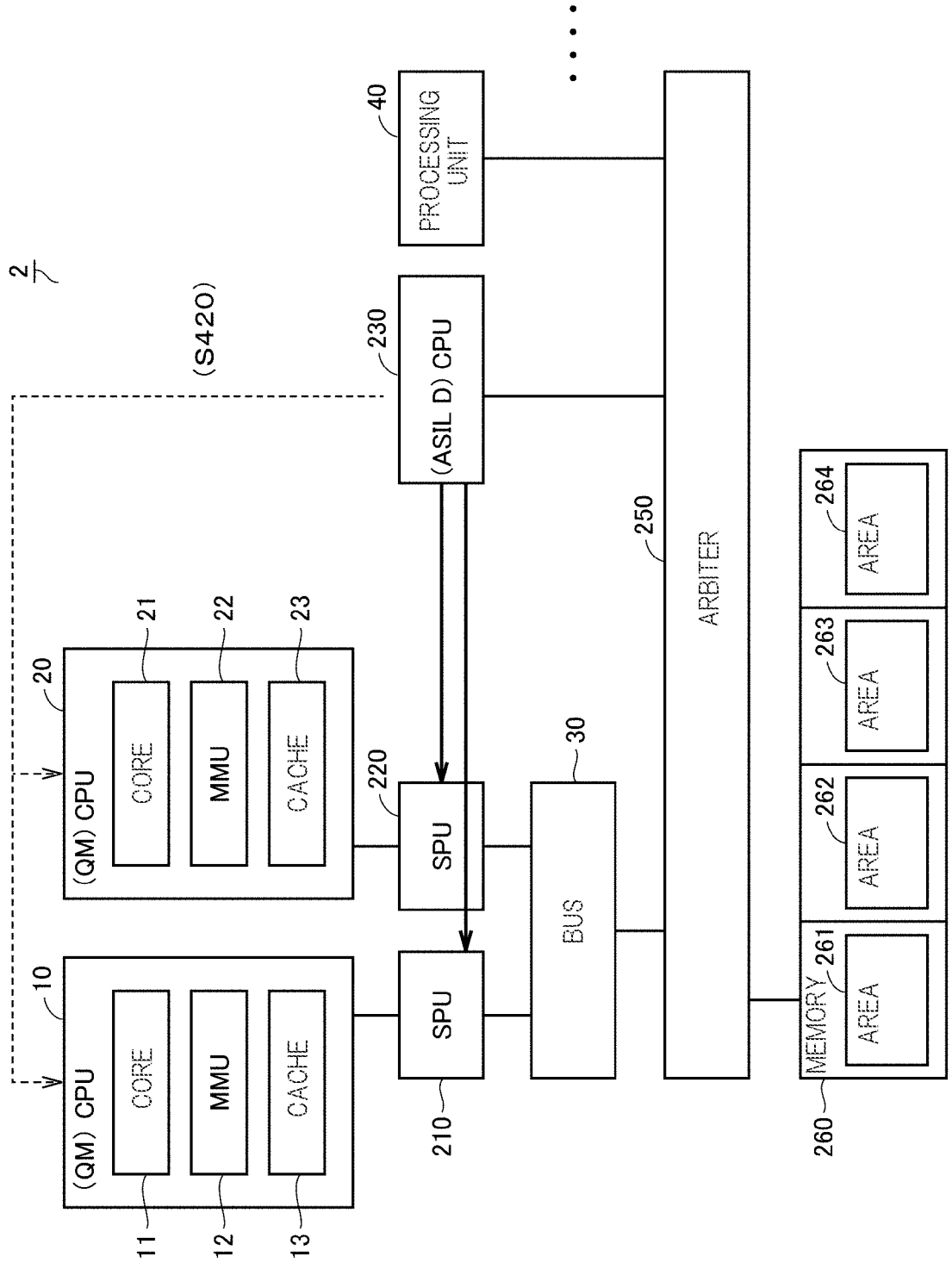
FIG. 8 is a diagram explaining the operation of the semiconductor device 2.

Referring to FIG. 8, the CPU 230 starts the CPUs 10 and 20 for executing the software lock-step (step S420). In one aspect, the CPU 230 transmits start instructions to CPUs 10 and 20 via the arbiter 250, the bus 30 and SPUs 210 and 220, respectively. In another aspect, a separate bus may be provided for the CPU 230 to transmit the activation command to the CPUs 10 and 20.

Figure 9:
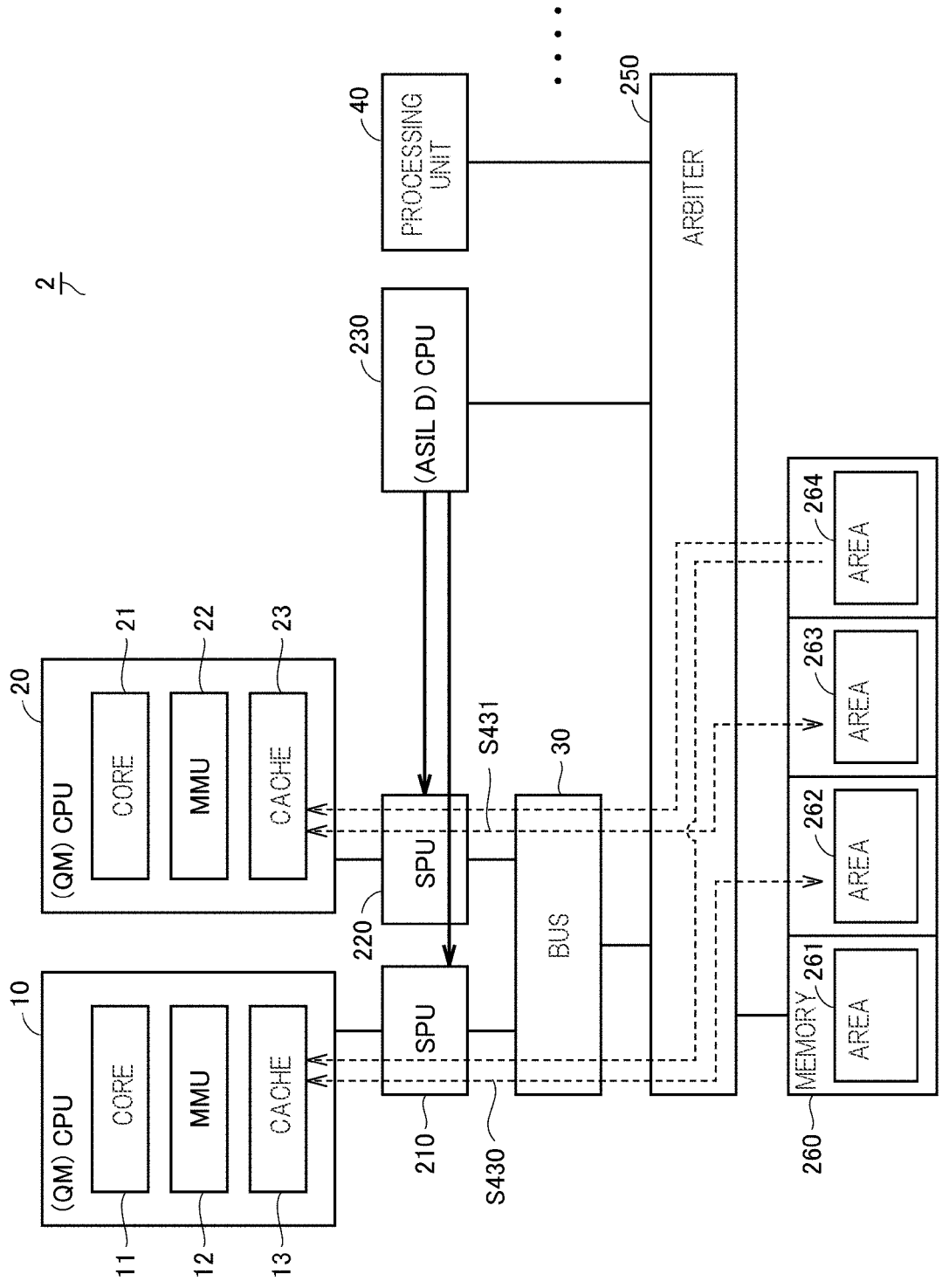
FIG. 9 is a diagram explaining the operation of the semiconductor device 2.

Referring to FIG. 9, the CPUs 10 and 20 executes programs that produce the same result, and writes execution results in predetermined areas 262 and 263, respectively (steps S430 and S431).

Figure 10:
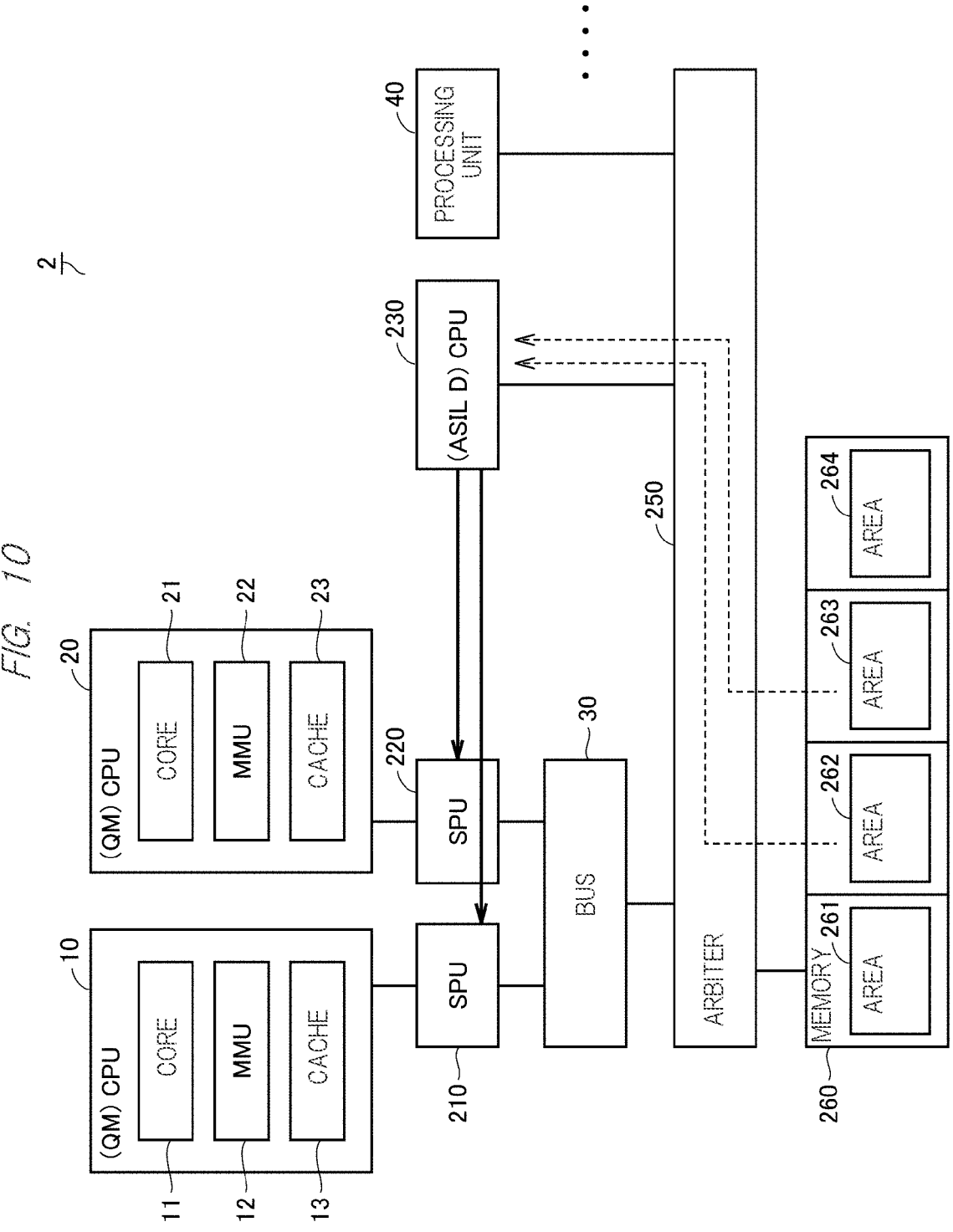
FIG. 10 is a diagram explaining the operation of the semiconductor device 2.

Referring to FIG. 10, the CPU 230 reads the execution results from the areas 262 and 263 and compares the execution results (Step S445). If the CPU 230 determines that the execution results coincide with each other, the CPU 230 may store data indicating that the execution results coincide with each other at a predetermined address of the area 264. If the execution results do not coincide with each other, the CPU 230 may store data indicating of faulty of the CPU 10 or 20, or other errors at a predetermined address of the area 264.

Figure 11:
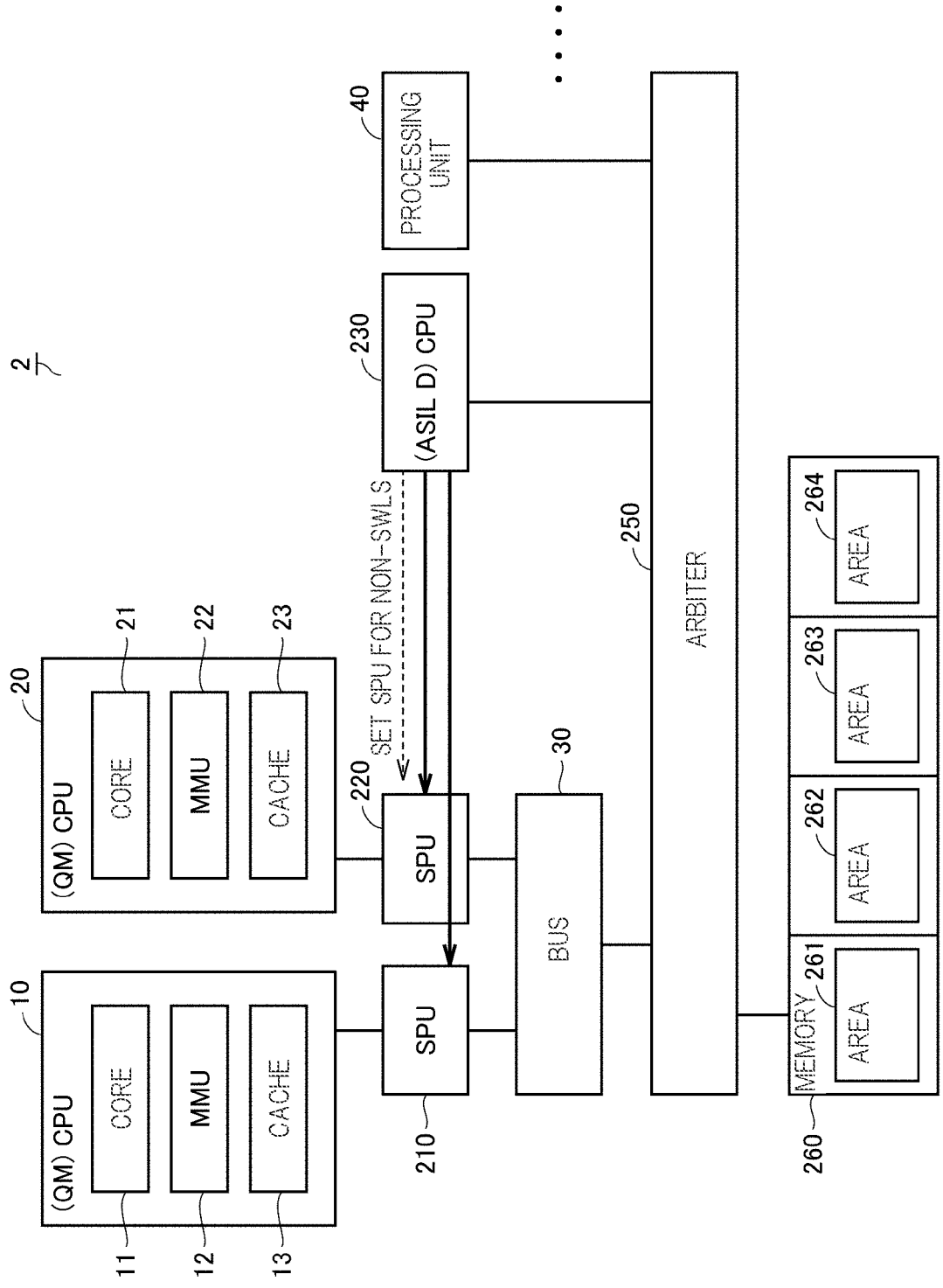
FIG. 11 is a diagram explaining settings in a case where the software lock-step is not performed.

FIG. 11 is a diagram for explaining a setting when a software lock-step is not performed. In another aspect, if the CPUs 10 and 20 do not perform the software lock-step, the CPU 230 permits a snoop operation by the SPUs 210 and 220 by changing the settings of the SPUs 210 and 220 to non-software lock-step.

Protection when Snoop Operation is Erroneously Performed

Figure 12:
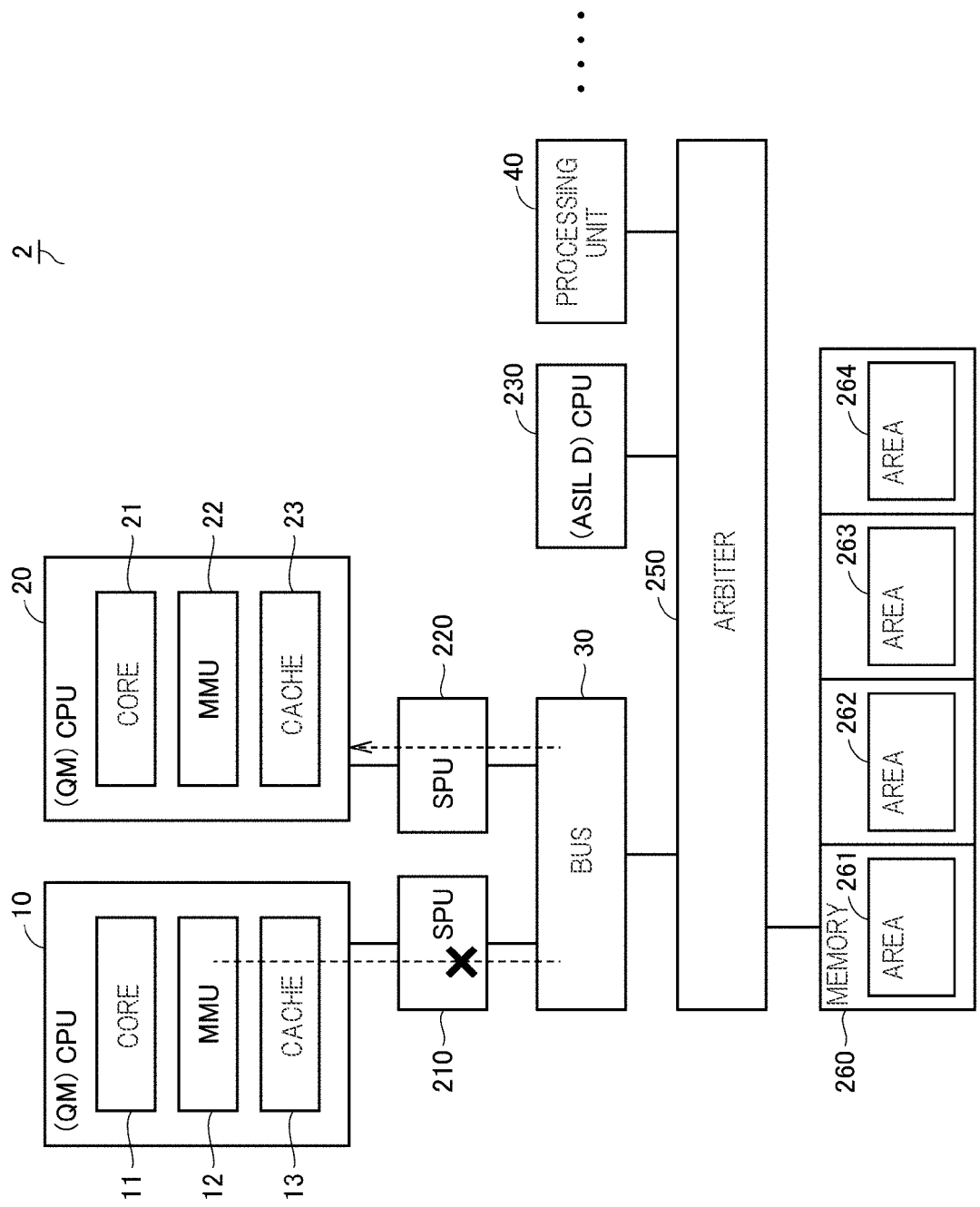
FIG. 12 is a diagram explaining protection in a case where a snoop operation is erroneously performed to other CPUs.

FIG. 12 is a diagram for explaining protection when a snoop operation is erroneously performed on another CPU. The semiconductor device 2 according to one aspect may use an AXI Coherency Extensions (ACE) protocol in which a bus is extended according to an Advanced eXtensible Interface (AXI) standard. An ARDOMAIN signal and an ARSNOOP signal are added to a read data channel among five channels constituting an interface according to the AXI standard. The ARSNOOP signal indicates a type of a snoop transaction for a transaction shared in the read and write channels. The ARDOMAIN signal indicates which masters are to be snooped in the snoop transaction and which masters are to be considered to command a barrier transaction.

When the snoop operation is performed, the ARDOMAIN signal in the transaction is 01 or 10 in binary or the ARSNOOP signal is other than 0. When such a signal comes, the ARSNOOP signal is forced to 0. By doing so, the transaction becomes a transaction that does not use a cache, and an occurrence of the snoop operation can be prevented.

The same applies to a write transaction. An access for a snoop operation is a normal access, and if an address is abnormal, the access is prevented by the arbiter 250. If data is wrong, the CPU 230 may detect a fault based a comparison result in the process of comparing the execution results of the processing of the software lock-step.

Protection when Address is Abnormal

Figure 13:
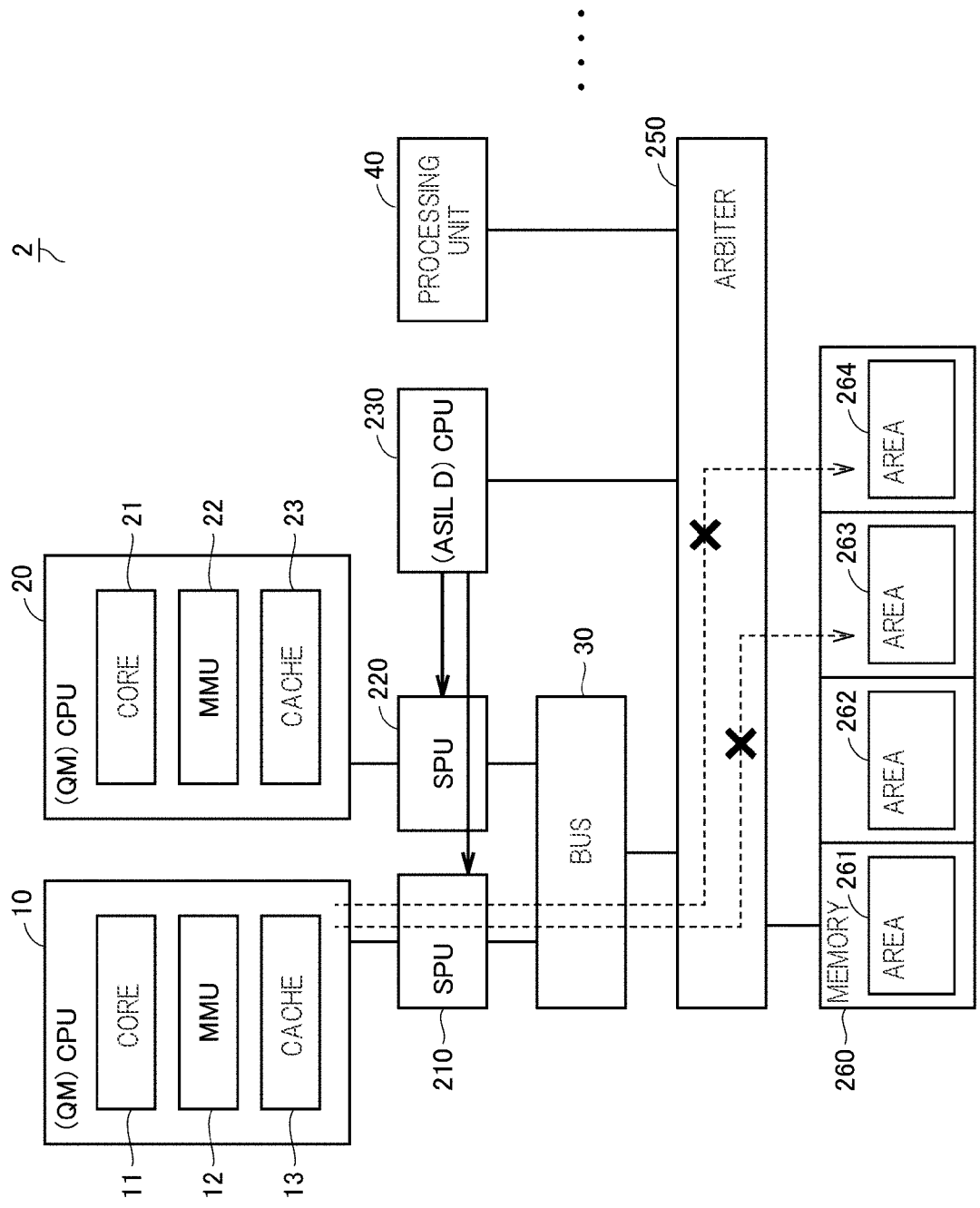
FIG. 13 is a diagram explaining protection in a case where accesses are performed across an address area of a memory 260.

FIG. 13 is a diagram for explaining protection when an access across the address areas in the memory 260 is performed. In one aspect, when the arbiter 250 detects the access across the address areas in the memory 260, the arbiter 250 prohibits the access and returns an error response to a processor that provided a transaction leading to the access. More specifically, the arbiter 250 monitors an address of the transaction and prevents the access to that address when the arbiter 250 detects that an issuer of the transaction must not access that address. The issuer may be identified by identification information attached to the transaction. The identification information may be, for example, an AxID or the other values. Whether the access to the address is permitted or not is set in advance in the CPU 230, for example.

Setting for Permitting Snoop Operation

Figure 14:
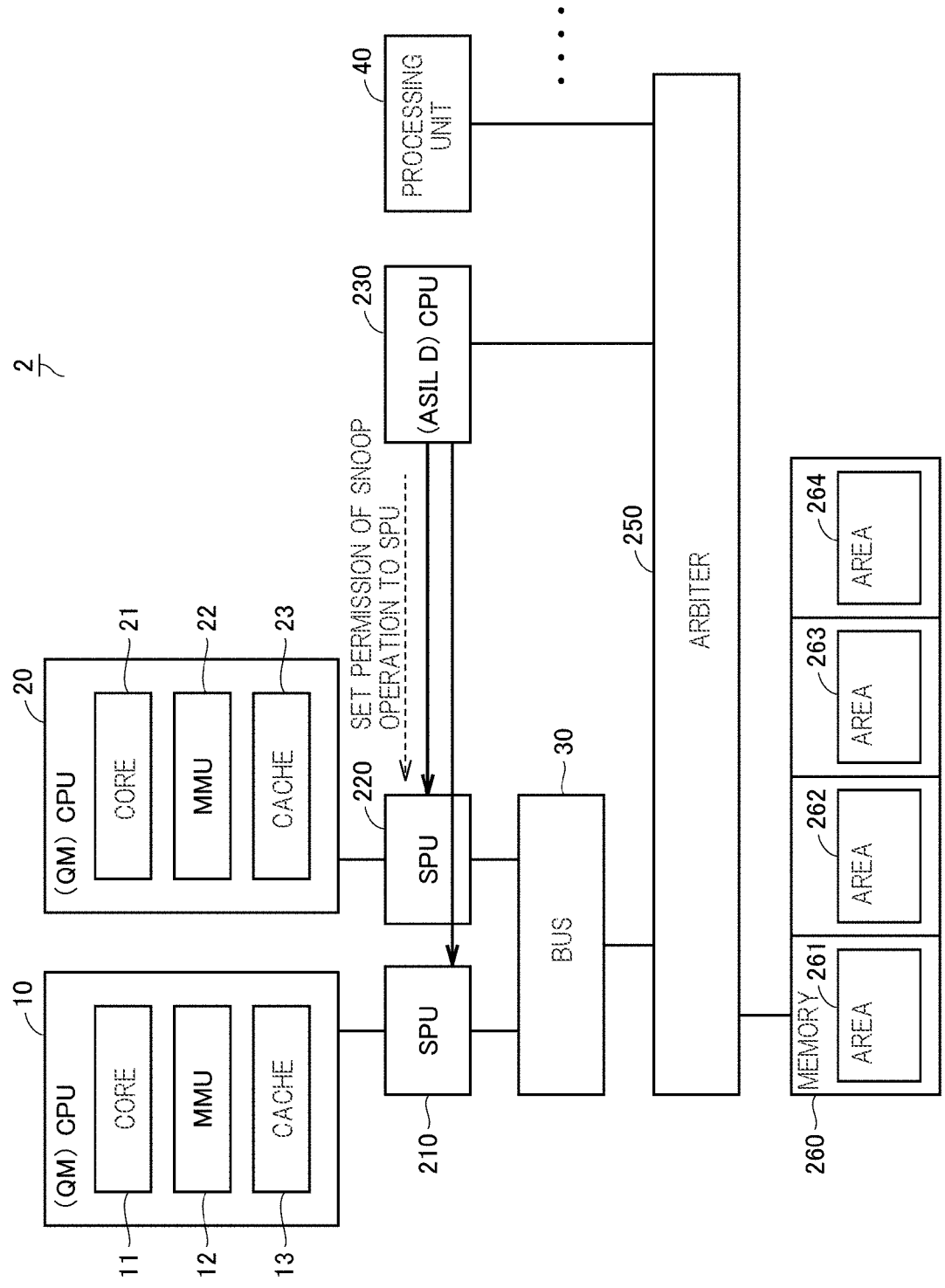
FIG. 14 is a diagram explaining an operation in a case of permitting the snoop operation.

FIG. 14 is a diagram for explaining an operation in a case of permitting a snoop operation. In one aspect, the CPU 230 transmits signals for permitting the snoop operation by the SPUs 210 and 220 to the SPUs 210 and 220 via the arbiter 250 and the bus 30. Upon receiving the signals, the SPUs 210 and 220 set the setting of the protection ON and OFF register 320 to OFF (FIG. 3). When the setting is set to OFF, the snoop bit force invalidation block 310, if detecting a signal (e.g., ARSNOOP signal) representing the snoop operation included in a request from the CPU 10 or 20, sends the signal to the arbiter 250 as it is, so that the snoop operation is performed.

Figure 15:
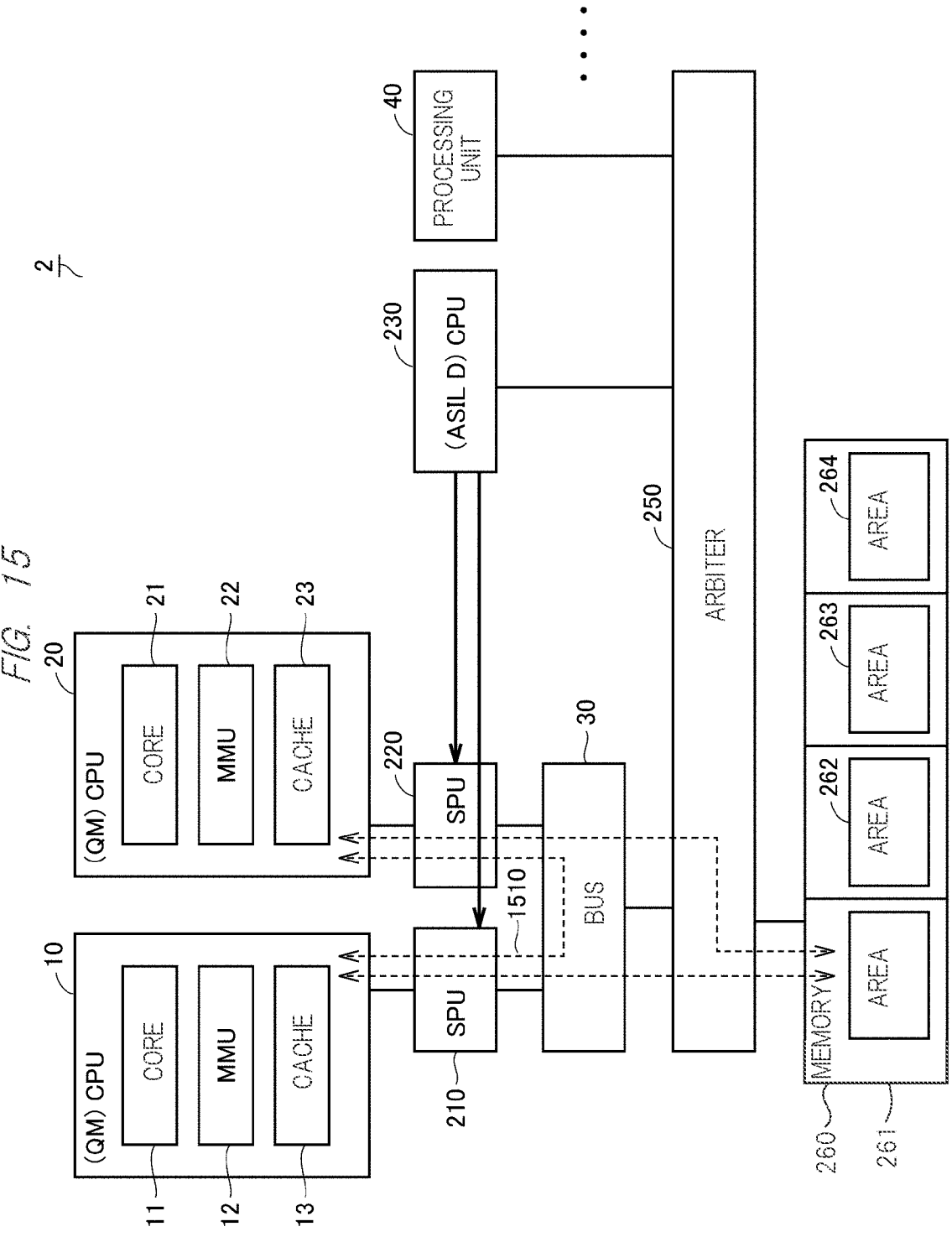
FIG. 15 is a diagram explaining an operation in a case where the snoop operation is being permitted.

FIG. 15 is a diagram showing an operation in a case where a snoop operation is being permitted. In one aspect, if the snoop operation is permitted, the CPU 10 may the snoop operation to the cache 23 and the CPU 20 may the snoop operation to the cache 13. In addition, CPUs 10 and 20 are permitted to accesses only the area 261 of the memory 260 that is not used for the software lock-step, and accesses to the other areas 262, 263 and 264 by the CPUs 10 and 20 are prohibited.

Figure 16:
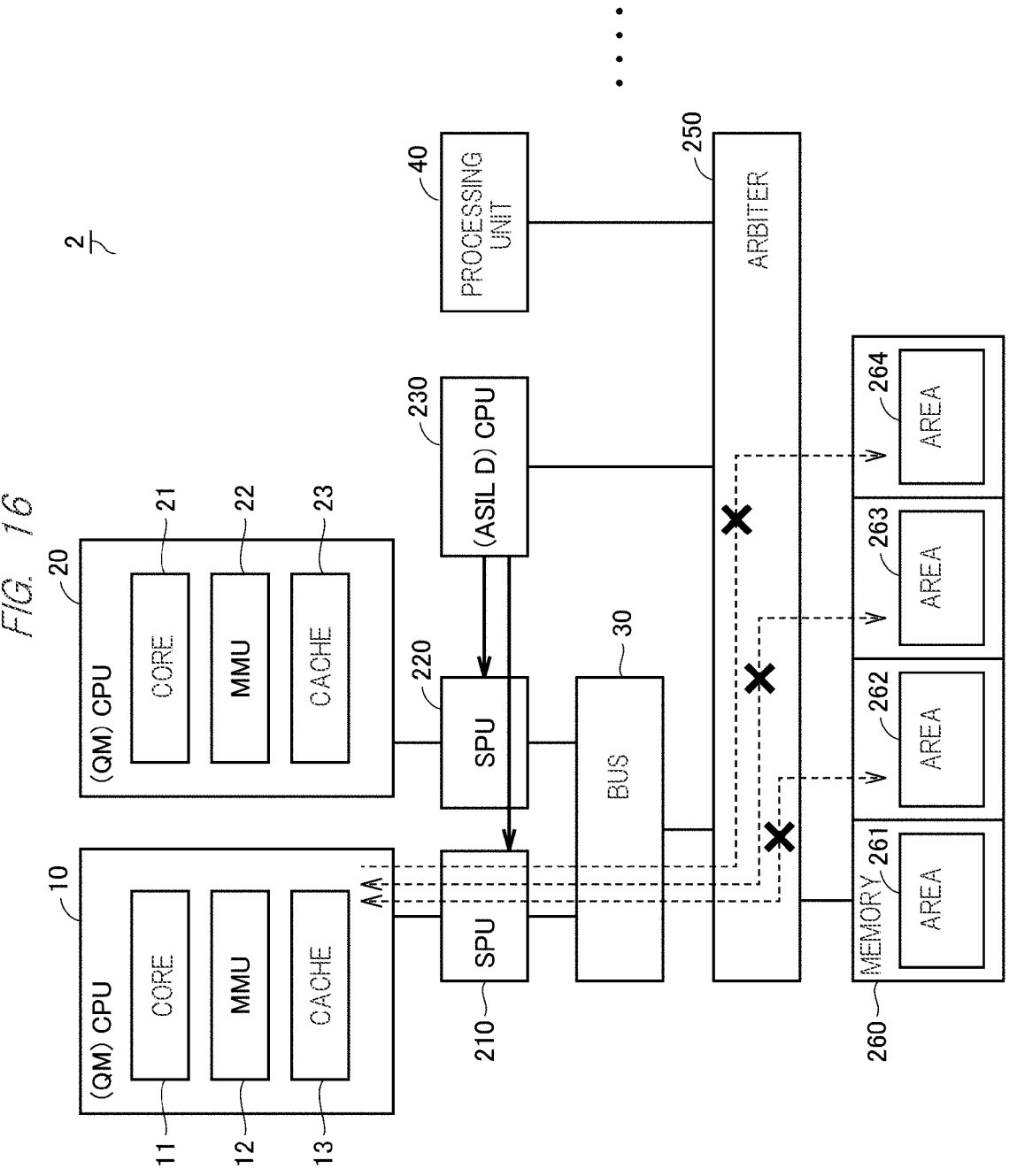
FIG. 16 is a diagram explaining an operation of the semiconductor device 2 in a case where the software lock-step is not being performed.

FIG. 16 is a diagram for explaining an operation of the semiconductor device 2 in a case where the software lock-step is not being performed. In one aspect, the arbiter 250 provides address protection for the areas 262, 263, and 264 when the software lock-step is not being performed. Therefore, the CPU 10 cannot access the areas 262, 263 and 264.

As described above, the semiconductor device 2 according to the present embodiment includes the SPUs 210 and 220 for preventing an erroneous snoop operation from being performed, the arbiter 250 capable of protecting addresses, and the CPU 230 supporting the ASIL D class for controlling the software lock-step. With such a configuration, the achieved ASIL D using the software lock-step can be realized in the semiconductor device 2. As shown in FIG. 3, the SPUs 210 and 220 according to the present embodiment are made up of simple configuration and does not require a significant increase in the area of the semiconductor device 2 and no increase in latency. Since the software lock-step is controlled by the CPU 230, the software lock-step can be introduced even if the CPUs 10 and 20 cannot be changed.

Second Embodiment

Hereinafter, a second embodiment will be described. A semiconductor device according to the present embodiment is different from the first embodiment having one type of IP core in that a software lock-step can be performed when two types of CPUs are provided as CPUs which are an example of so-called IP core.

Figure 17:
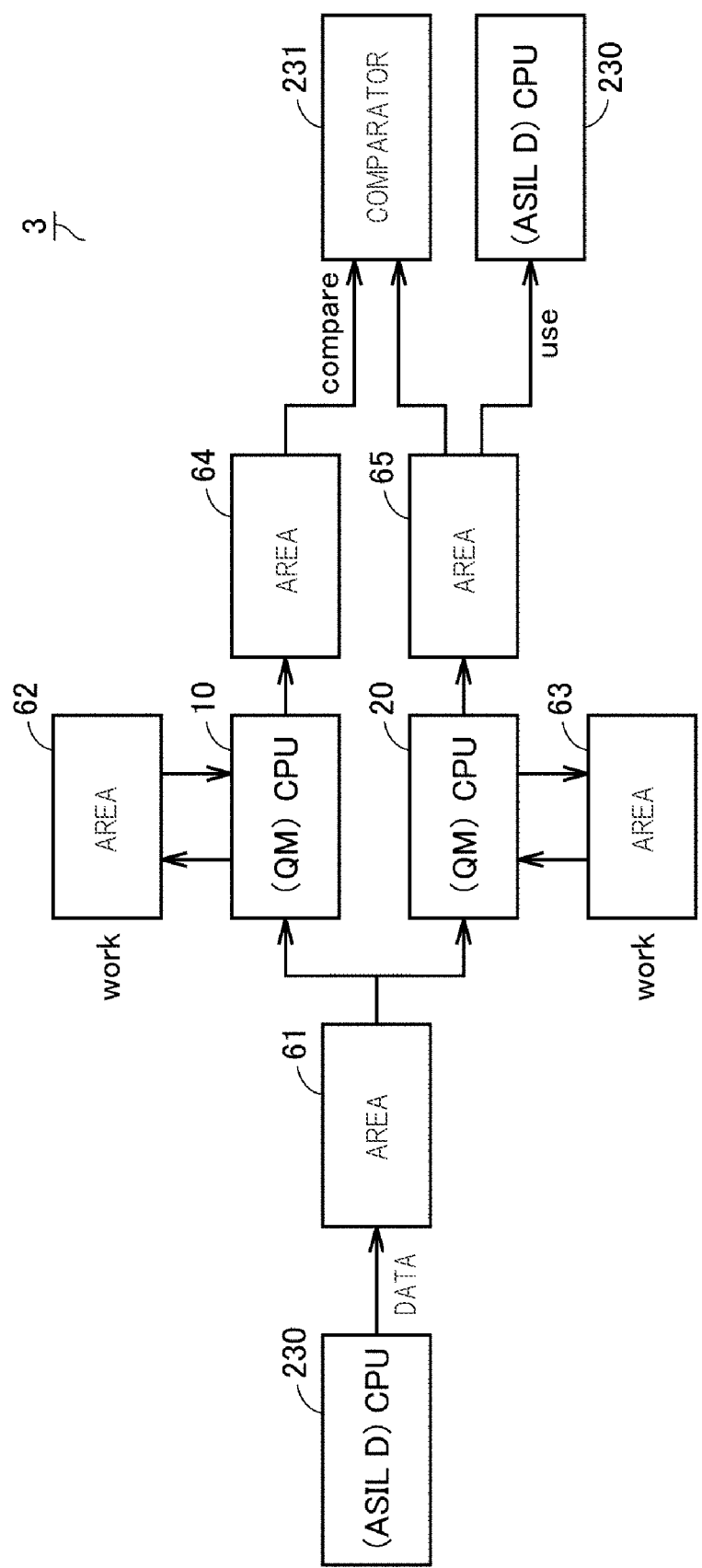
FIG. 17 is a diagram showing a flow of data in a semiconductor device 3 according to one certain aspect.

FIG. 17 is a diagram showing a flow of data in a semiconductor device 3 according to one aspect. In the semiconductor device 3, the CPU 230 reads and writes data from and to an area 61 of the memory 260. The CPUs 10 and 20 read data from the area 61. When performing the software lock-step, the CPU 10 reads and writes data to and from an area 62 of the memory 260, and writes data to an area 64 of the memory 260. When performing the software lock-step, the CPU 20 reads and writes data from and to an area 63 of the memory 260, and writes data to an area 65 of the memory 260. The CPU 230 compares the data written in the areas 64 and 65 as a comparator 231, and when these data coincide with each other, the data is used as data of the ASIL D class.

FIG. 17 shows a case where the software lock-step is applied to one type of IP core. If the software lock-step is applied successively to two types of IP cores, two comparison processes are required, more specifically, bandwidth and comparison time for data communication for performing the software lock-step twice are required. Therefore, in the present embodiment, a configuration in which increase in bandwidth and comparison time is suppressed when the software lock-step is performed on two types of IP cores will be described.

Figure 18:
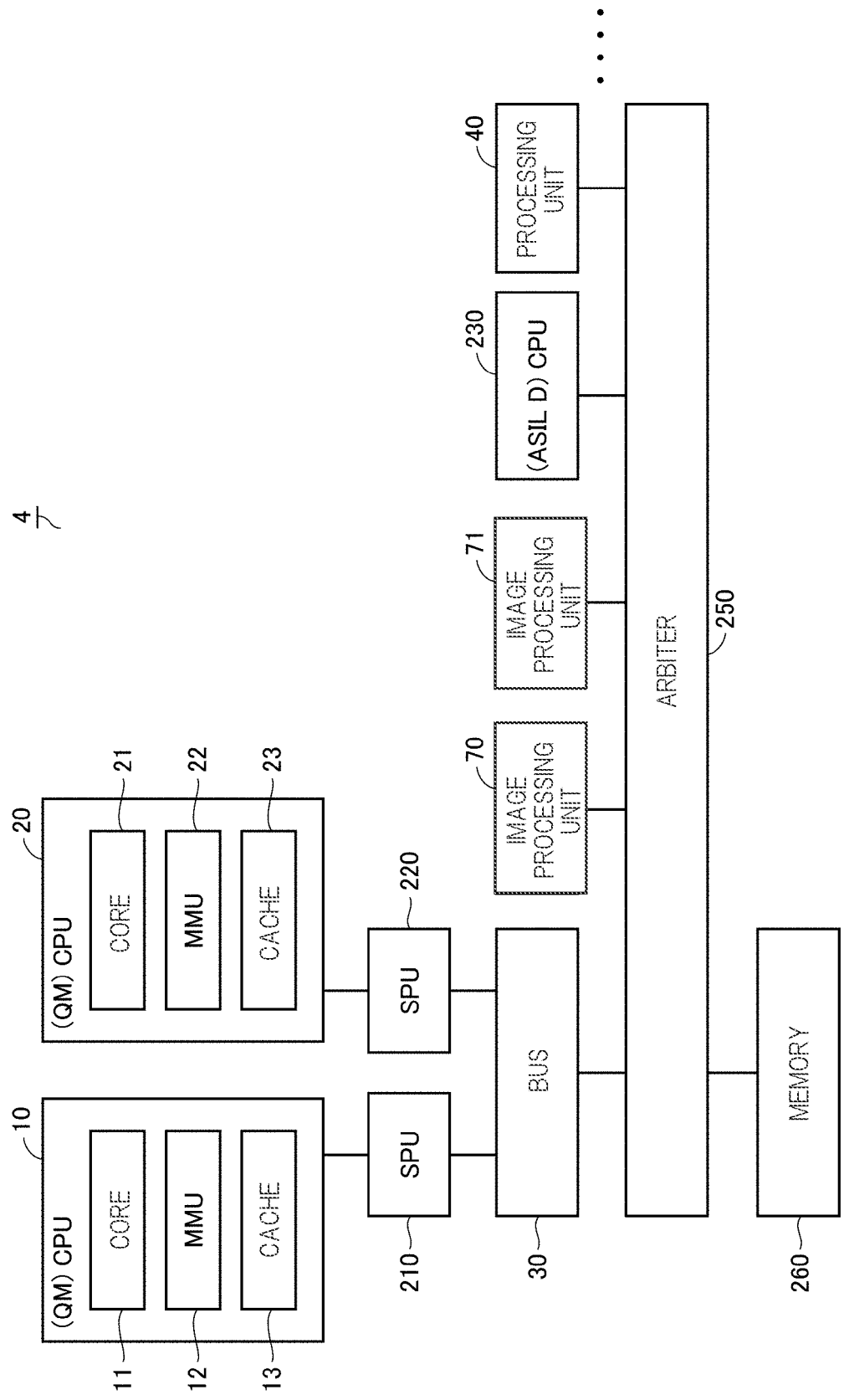
FIG. 18 is a block diagram showing an outline of a configuration of a semiconductor device 4 according to one aspect.

FIG. 18 is a block diagram showing an outline of a configuration of a semiconductor device 4 according to one aspect. Components identical to those described above are denoted by the same reference numerals. Functions of the components is the same. Therefore, the description of the components will not be repeated.

The semiconductor device 4 includes image processing units 70 and 71 in addition to the components shown in FIG. 2. The image processing units 70 and 71 are connected to the arbiter 250. The image processing units 70 and 71 are examples of IPs that does not support the ASIL D (e.g., image processing units supporting the ASIL B class), but the IP that does not support the ASIL D is not limited to the image processing unit.

In the software lock-step, the semiconductor device 4 according to the present embodiment passes calculation results by the first set of IPs (i.e., image processing units 70 and 71) to the second set of IPs (i.e., CPUs 10 and 20) without comparing the calculation results. Thus, one comparison process is omitted.

Figure 19:
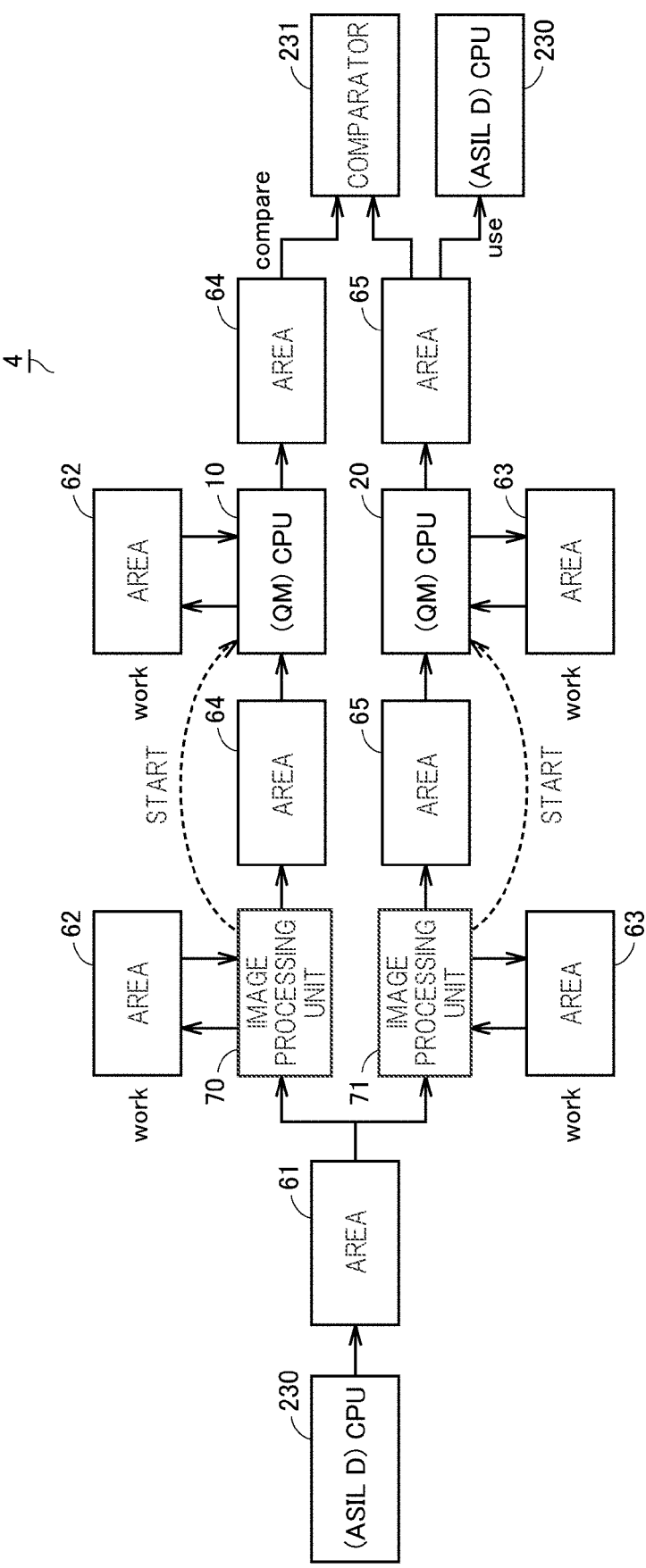
FIG. 19 is a diagram showing a flow of data in the semiconductor device 4.

FIG. 19 is a diagram showing a flow of data in the semiconductor device 4. When the CPU 230 writes data in the area 61 of the memory 260, the image processing units 70 and 71 read the data from the area 61. The image processing unit 70 writes and reads data to and from the area 62. The image processing unit 71 writes and reads data to and from the area 63.

Further, the image processing unit 70 writes an execution result of a program for the software lock-step in the area 64. When the writing is completed, the image processing unit 70 notifies the CPU 10 of the completion of the writing, and starts the CPU 10 to execute the program for the software lock-step. Similarly, the image processing unit 71 writes an execution result of the program for the software lock-step in the area 65. When the writing is completed, the image processing unit 71 notifies the CPU 20 of the completion of the writing, and starts the CPU 20 to execute the program for the software lock-step.

The CPU 10 reads data from the area 64. The CPU 10 writes and reads data to and from the area 62. Further, the CPU 10 executes the program for the software lock-step using the execution result by the image processing unit 70, and writes an execution result in the area 64. The CPU 20 reads data from the area 65. The CPU 20 writes and reads data to and from the area 63. Further, the CPU 20 executes the program for the software lock-step using the execution result by the image processing unit 71, and writes an execution result in the area 65.

The CPU 230 compares the execution results written in the areas 64 and 65 as the comparator 231, and the above data is used as data of the ASIL D class when the execution results coincide with each other.

The areas 62 and 64 can be used exclusively by the image processing unit 70 and the CPU 10. The areas 63 and 65 can be used exclusively by the image processing unit 71 and the CPU 20.

Figure 20:
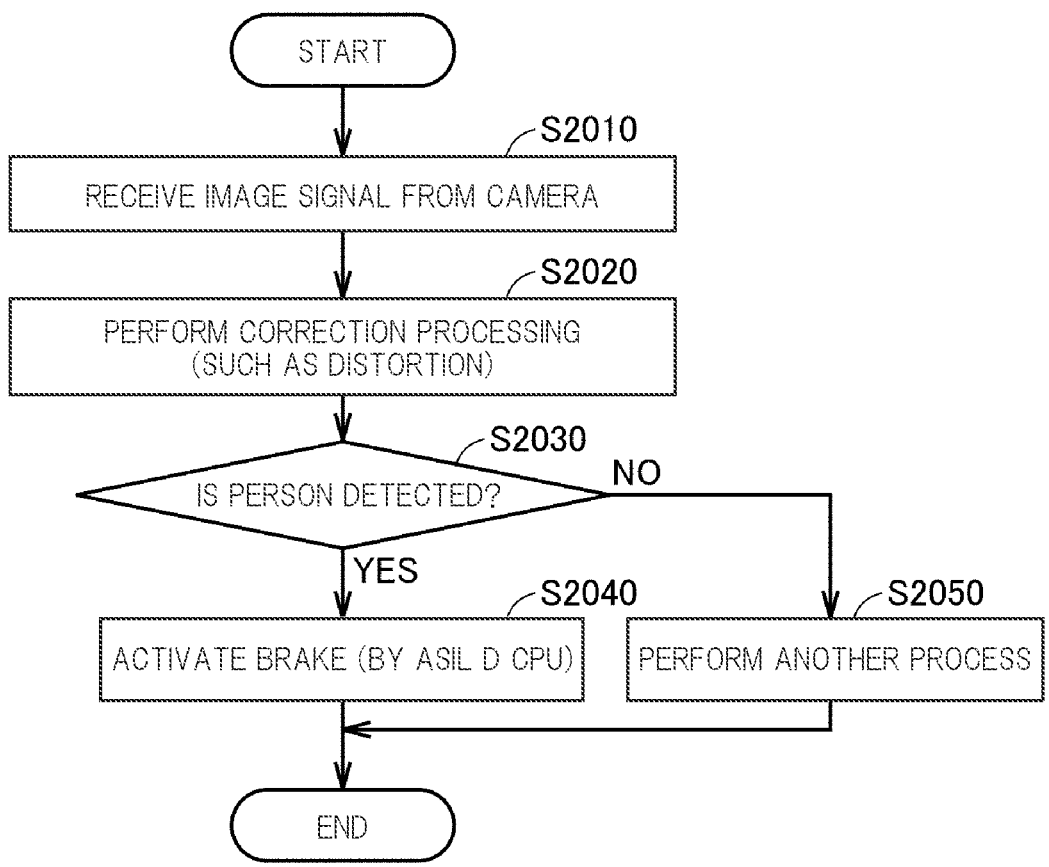
FIG. 20 is a flowchart showing a part of processes performed by the semiconductor device 4.

Here, an example of an aspect in which the semiconductor device 4 is used will be described with reference to FIG. 20. FIG. 20 is a flowchart showing a part of processes performed by the semiconductor device 4. The semiconductor device 4 is connected to a camera for photographing a periphery of a vehicle.

In step S2010, the semiconductor device 4 receives an image signal from the camera. In step S2020, the image processing unit 70 (or the image processing unit 71) executes distortion correction or other image processing. A result of the image processing is stored in the area 64 (or area 65).

In step S2030, the CPU 10 (or CPU 20) determines whether a person has been detected. The detection of the person is realized by using known techniques such as face recognition, feature quantity calculation, and the like. A detection result is written in the area 64 (or area 65). If the CPU 10 (or CPU 20) determines that the person has been detected (YES in step S2030), then in step S2040, the CPU 230 supporting the ASIL D level transmits a signal for activating a brake of the vehicle to a brake control device. Thereafter, the vehicle stops.

On the other hand, when the CPU 10 (or CPU 20) determines that the person has not been detected (NO in step S2030), then in step S2050, any one of the CPUs 10, 20 and 230 performs another predetermined process.

As described above, according to the present embodiment, when there are two types of CPUs, image processing units, and other IPs that are targets of the software lock-step, the execution results of the program by the first set of IPs are used for executing the program for the software lock-step by the second set of IPs without comparing the execution results. As a result, since the comparison process can be limited to one time, the time for data reading, data writing, and the comparison process for the first comparison of the execution result becomes unnecessary, and an increase in a processing time of the semiconductor device 4 can be prevented.

Third Embodiment

Hereinafter, a third embodiment will be described. In each of the embodiments described above, the execution results of the program for the software lock-step are compared. On the other hand, the present embodiment differs from the above-described embodiments in that data other than the execution results are compared. A case where Cyclic Redundancy Codes (CRCs) based on the execution results are compared will be described below, but an object to be compared is not limited to the CRC, and may be, for example, a hash or the like in which the number of bytes is reduced while realizing a fault detection rate of the ASIL D class.

Figure 21:
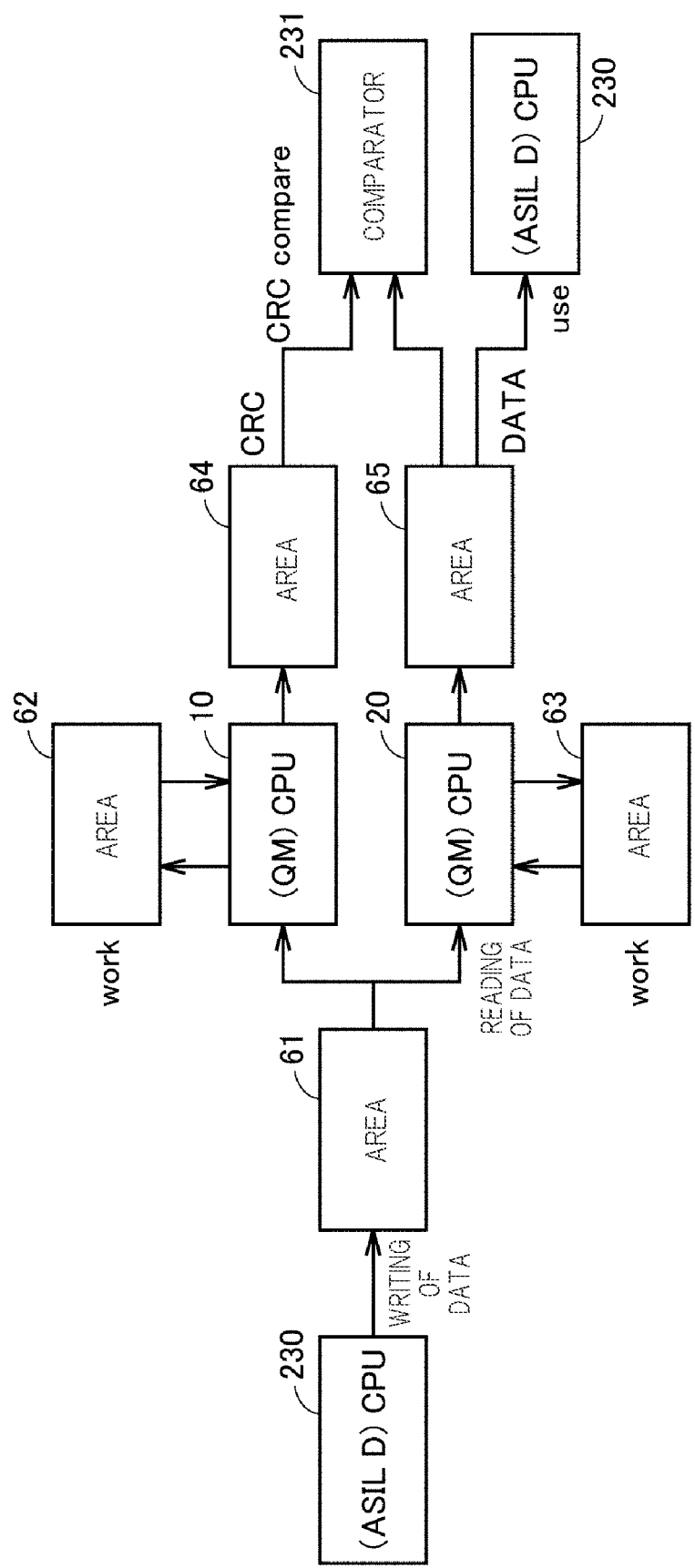
FIG. 21 is a diagram showing a flow of data in a semiconductor device 5.

FIG. 21 is a diagram showing a flow of data in a semiconductor device 5. In one aspect, the CPU 230 writes data in the area 61. The CPU 10 reads the data from the area 61, and writes and reads data to and from the area 62. The CPU 20 reads the data from the area 61, and writes and reads data to and from the area 63.

The CPU 10 executes the program for the software lock-step using the data read out from the area 62, generates a CRC from the execution result of the program for the software lock-step, and writes the generated CRC in the area 64. The CPU 20 executes the program for the software lock-step using the data read from the area 63, and writes the execution result of the program for the software lock-step in the area 65.

The CPU 230 reads the execution result from the area 65 as the comparator 231, and generates a CRC from the read execution result. Further, the comparator 231 reads the CRC from the area 64, and compares the read CRC with the generated CRC. If these CRCs coincide with each other, the CPU 230 uses the above data as data of the ASIL D.

A data size of the CRC is, for example, 2 bytes for data of 256 bytes, but the data size is not limited to this.

Figure 22:
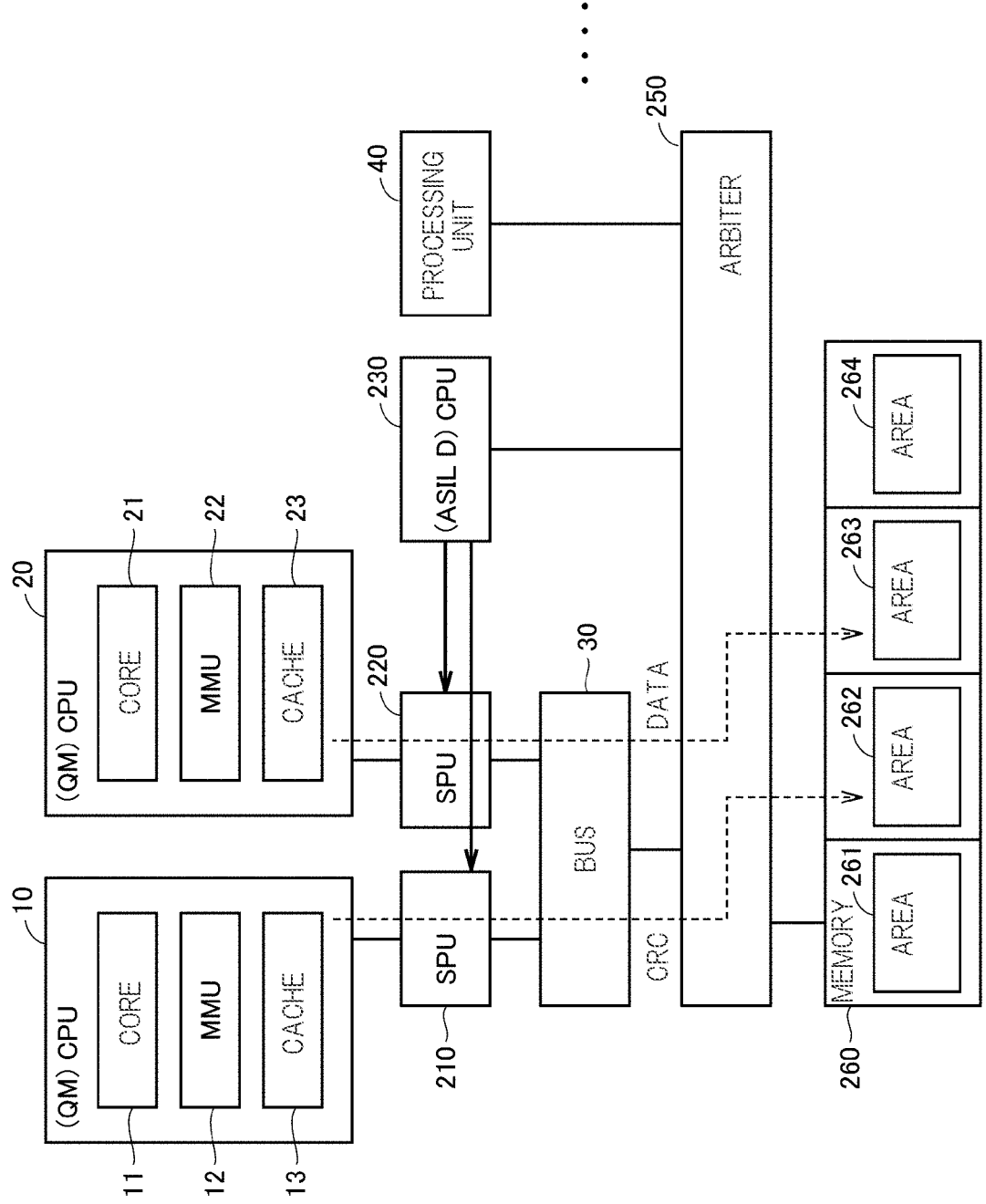
FIG. 22 is a diagram explaining outputs of execution results of programs by CPUs in the semiconductor device 5.

An operation of the semiconductor device 5 will be described with reference to FIGS. 22 and 23. FIG. 22 is a diagram for explaining outputs of execution results of programs by the CPUs in the semiconductor device 5. In one aspect, any one of the CPUs (e.g., CPU 10) executes the program for the software lock-step, generates a CRC from the execution result of the program for the software lock-step, and writes the CRC in the area 262 (corresponding to the area 64). The other CPU (e.g., the CPU 20) executes the program for the software lock-step, and writes the execution result of the program in the area 263 (corresponding to the area 65).

Figure 23:
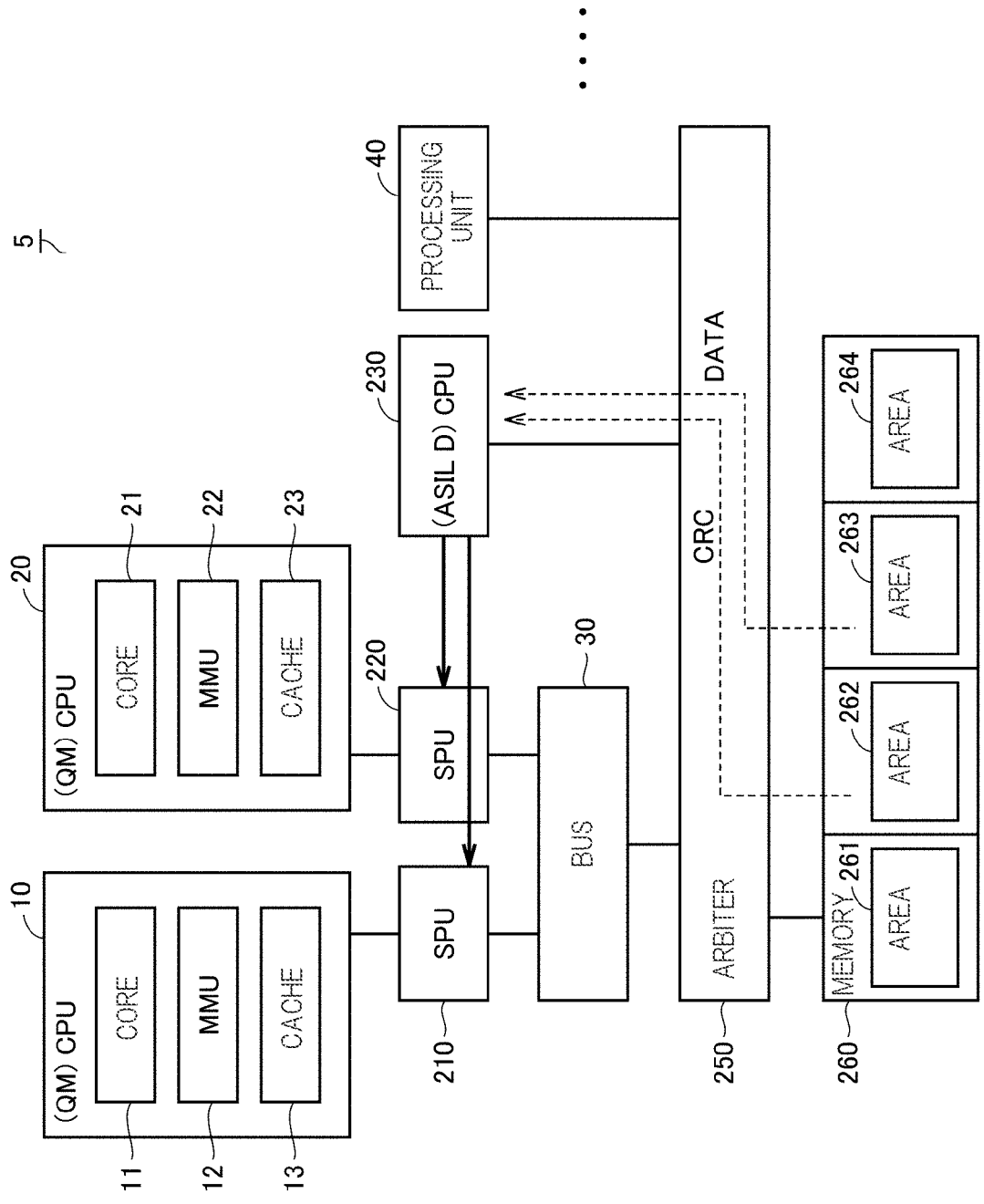
FIG. 23 is a diagram explaining a comparison of the execution results of the programs in the software lock-step in the semiconductor device 5.

FIG. 23 is a diagram for explaining a comparison of the execution results of the programs for the software lock-step in the semiconductor device 5. The CPU 230 reads the CRC from the area 262, reads data from the area 263, and calculates a CRC from the read data. The CPU 230 compares the read CRC with the calculated CRC as the comparator 231.

As described above, according to the present embodiment, the CRC is calculated from one of the execution results output from the two CPUs, and is written in a predetermined area of the memory 260. Thus, as accesses to the memory 260, writing of the CRC and the execution result, reading of the CRC and the execution result, and reading of data from the area 65 after comparison between the read CRC and the CRC calculated on the basis of the execution result are performed. According to such a configuration, the bandwidth can be increased by 1.5 times as compared with when CRCs are not used while maintaining the fault detection rate of the ASIL D class.

Fourth Embodiment

Hereinafter, a fourth embodiment will be described. A semiconductor device 6 according to the fourth embodiment is different from the above-described embodiments in that the comparison of the execution results in the software lock-step is performed by the arbiter.

Figure 24:
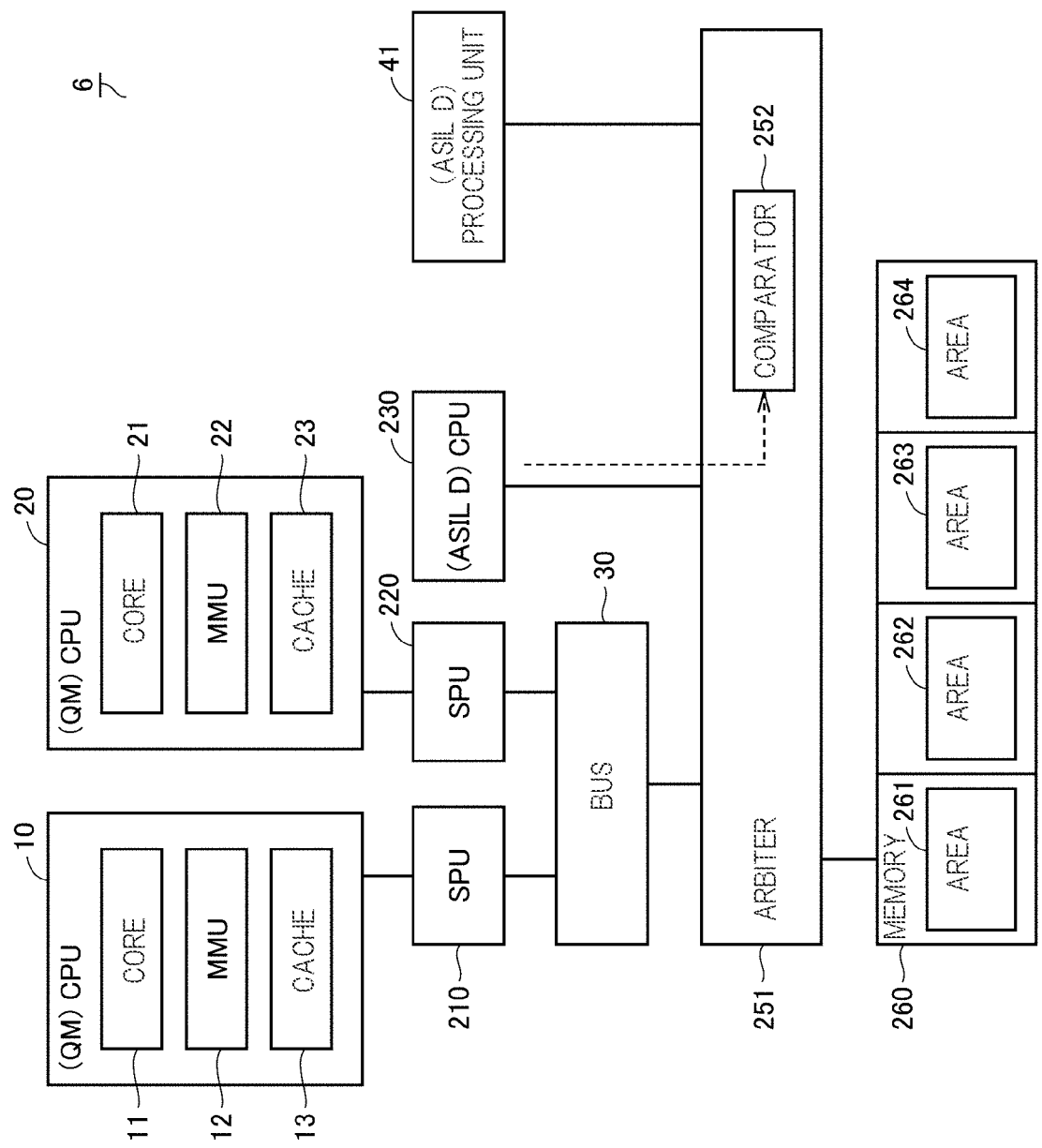
FIG. 24 is a block diagram showing a configuration of a semiconductor device 6.

FIG. 24 is a block diagram showing a configuration of the semiconductor device 6. The semiconductor device 6 includes an arbiter 251 instead of the arbiter 250, and a processing unit 41 instead of the processing unit 40, in contrast to the configuration shown in the semiconductor device 2. The arbiter 251 includes a comparator 252. The comparator 252 has registers for a comparison target address, a range, and a database address for comparison. The processing unit 41 is connected to the arbiter 251. The processing unit 41 supports, for example, the ASIL D class and may include a cache. In one aspect, the processing unit 41 may be a CPU.

Figure 25:
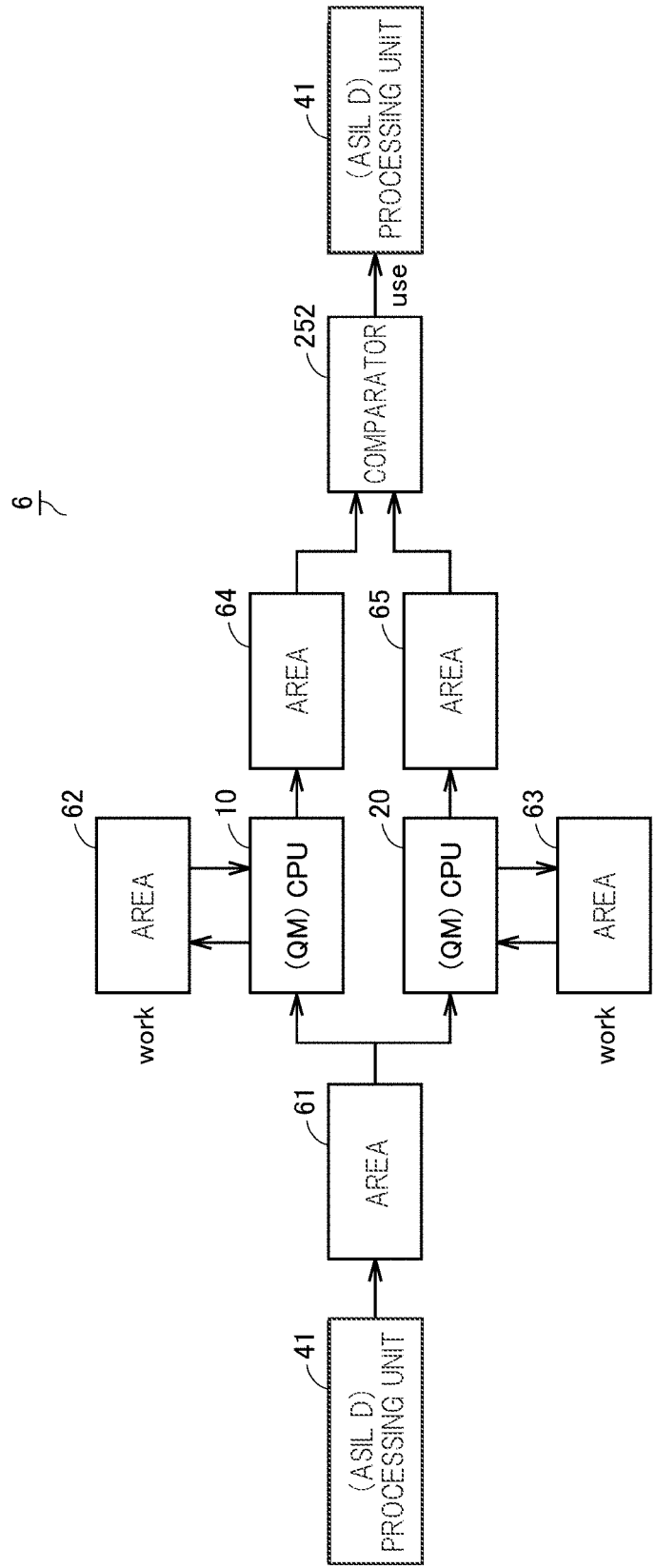
FIG. 25 is a diagram explaining a flow of data in the semiconductor 6.

FIG. 25 is a diagram for explaining a flow of data in the semiconductor device 6. In one aspect, when the CPU 230 writes data in the area 61, the CPUs 10 and 20 accesses the area 61 and reads the data, respectively. The CPU 10 writes the data in the area 62 and the CPU 20 writes the data in the area 63.

The CPU 10 reads data form the area 62, executes the program for the software lock-step, and writes the execution result of the program for the software lock-step in the area 64. The CPU 20 reads data from the area 63, executes the program for the software lock-step, and writes the execution result in the area 65.

When the comparator 252 receives a read request from the processing unit 41, the comparator 252 generates two read requests from the received read request. The comparator 252 accesses the areas 64 and 65 based on the generated read requests, and reads out the execution results. Further, the comparator 252 compares the read execution results, and when it is confirmed that the comparison results coincide with each other, transmits the read execution result to the processing unit 41.

Figure 26:
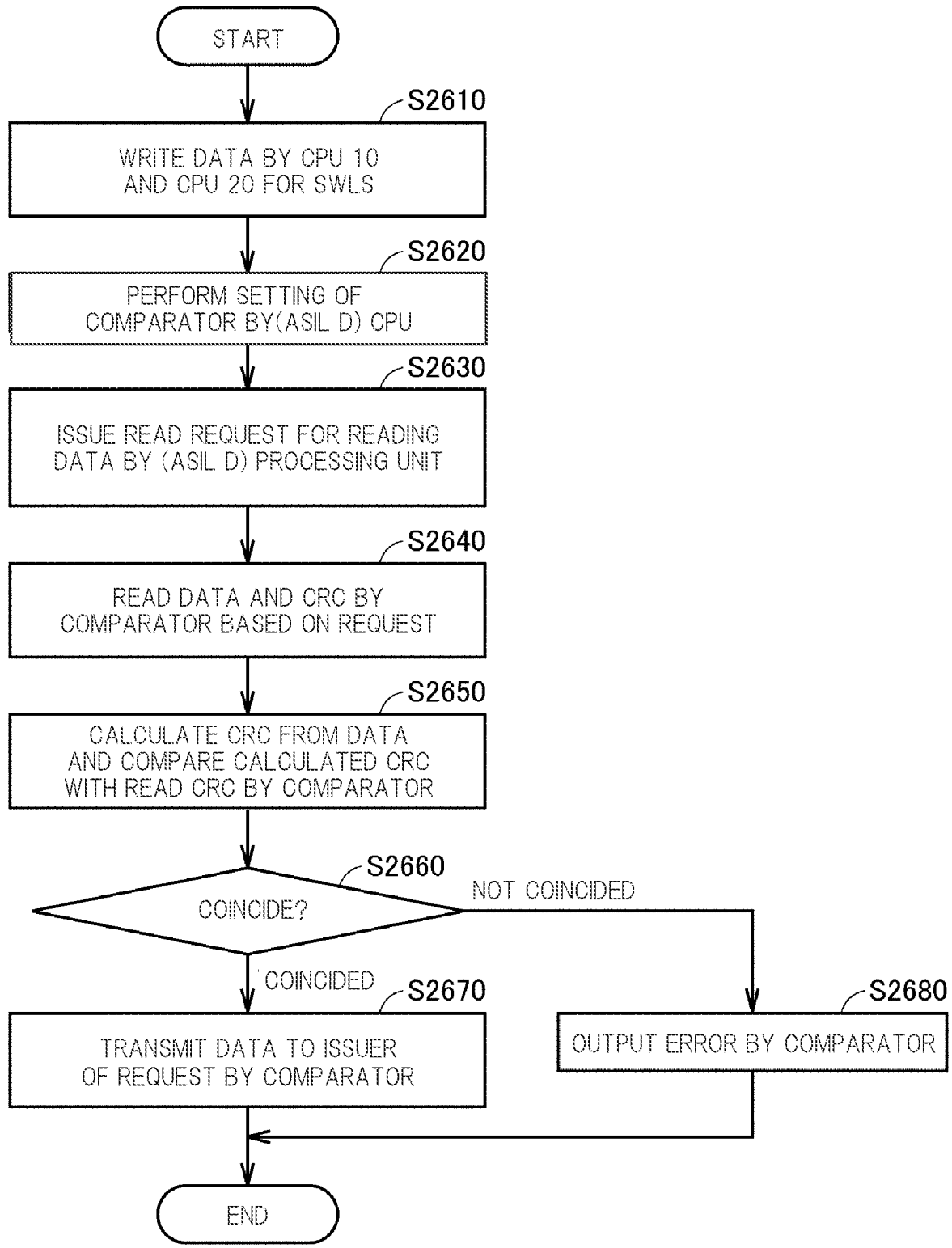
FIG. 26 is a flowchart explaining control steps of the semiconductor device 6.

FIG. 26 is a flowchart for explaining control steps of the semiconductor device 6. In step S2610, the CPUs 10 and 20 execute the program for the software lock-step, and write the execution results in the predetermined areas 62 and 63 of the memory 260, respectively.

In step S2620, the CPU 230 accesses the arbiter 251 to perform setting of the comparator 252. For example, the CPU 230 sets the comparison target address, the range, and the database address for comparison in the register.

In step S2630, the processing unit 41 supporting the ASIL D class reads data from a predetermined area.

In step S2640, the comparator 252 reads data from the areas 64 and 65, respectively, based on the request from the processing unit 41. For example, the comparator 252 reads the CRC from the area 64, and reads the execution result from the area 65. The CRC are generated by executing the program for the software lock-step by the CPU 10.

In step S2650, the comparator 252 calculates a CRC from the read data (execution result), and compares the calculated CRC with the read CRC.

In step S2660, the comparator 252 determines whether these CRCs coincide with each other. If the comparator 252 determines that the CRCs coincide with each other (YES in step S2660), then in step S2670, the comparator 252 transmits the execution result to the processing unit 41 issuing the request. Otherwise (NO in step S2660), in step S2680, the comparator 252 performs a predetermined error output process to notice an error.

Figure 27:
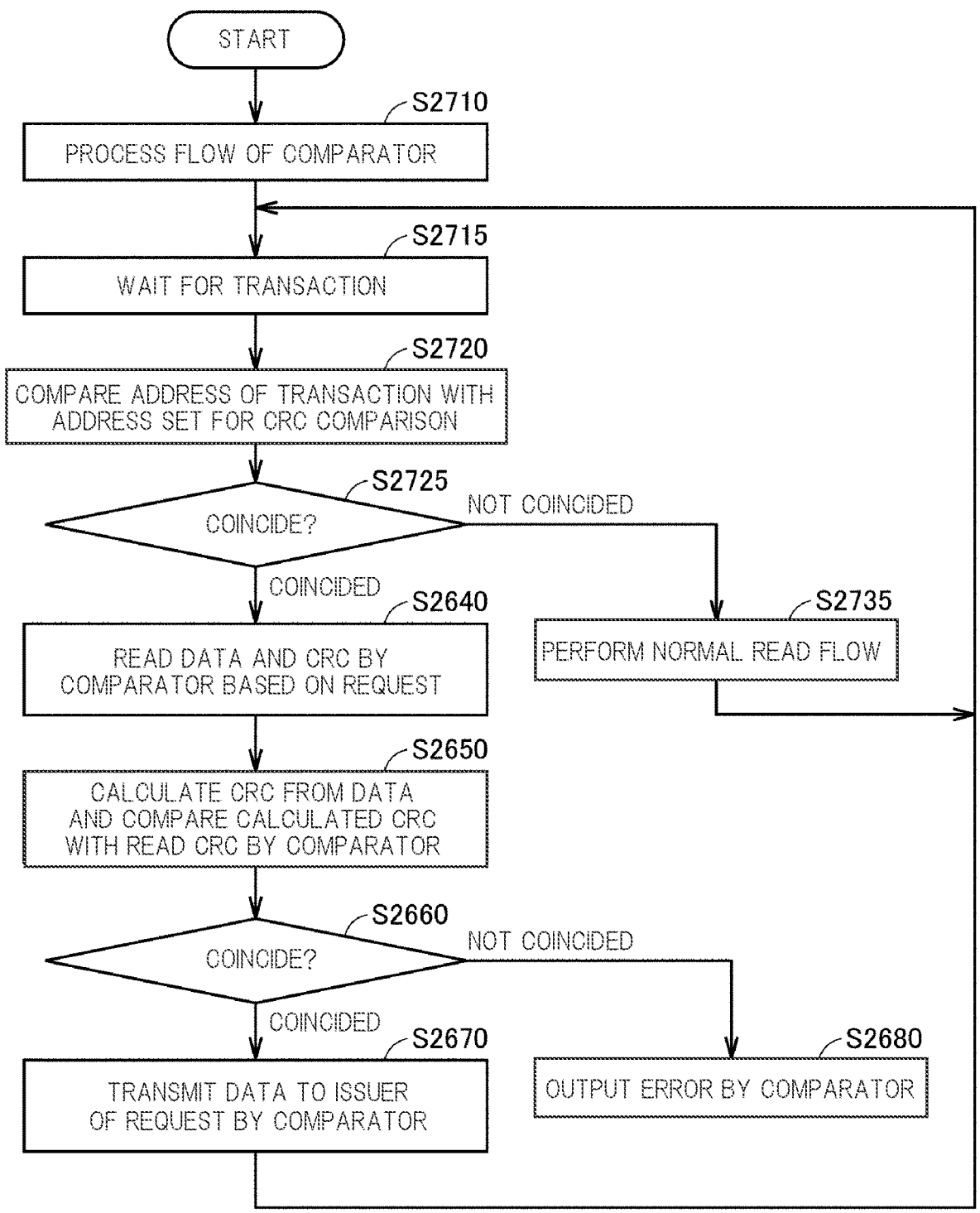
FIG. 27 is a flowchart showing a part of processes in the semiconductor device 6.

The operation of the semiconductor device 6 will be further described with reference to FIG. 27. FIG. 27 is a flowchart showing a part of processes in the semiconductor device 6.

In step S2710, the semiconductor device 6 performs the process of the comparator shown in FIG. 26. For example, the comparator 252 sets addresses for managing accesses to the memory 260 based on setting data sent from the CPU 230.

In step S2715, the comparator 252 waits for a request transaction from the CPU 230.

In step S2720, the comparator 252 compares an address included in the received request transaction with an address set for CRC comparison. In step S2725, the comparator 252 determines whether these addresses coincide with each other. When the comparator 252 determines that these addresses coincide with each other, the comparator 252 performs processes of step S2640 and subsequent steps. If these addresses do not coincide with each other, the comparator 252 determines that the request targeted for the transaction is a normal data read request, and in step S2735, the comparator 252 executes normal data read processing.

Figure 28:
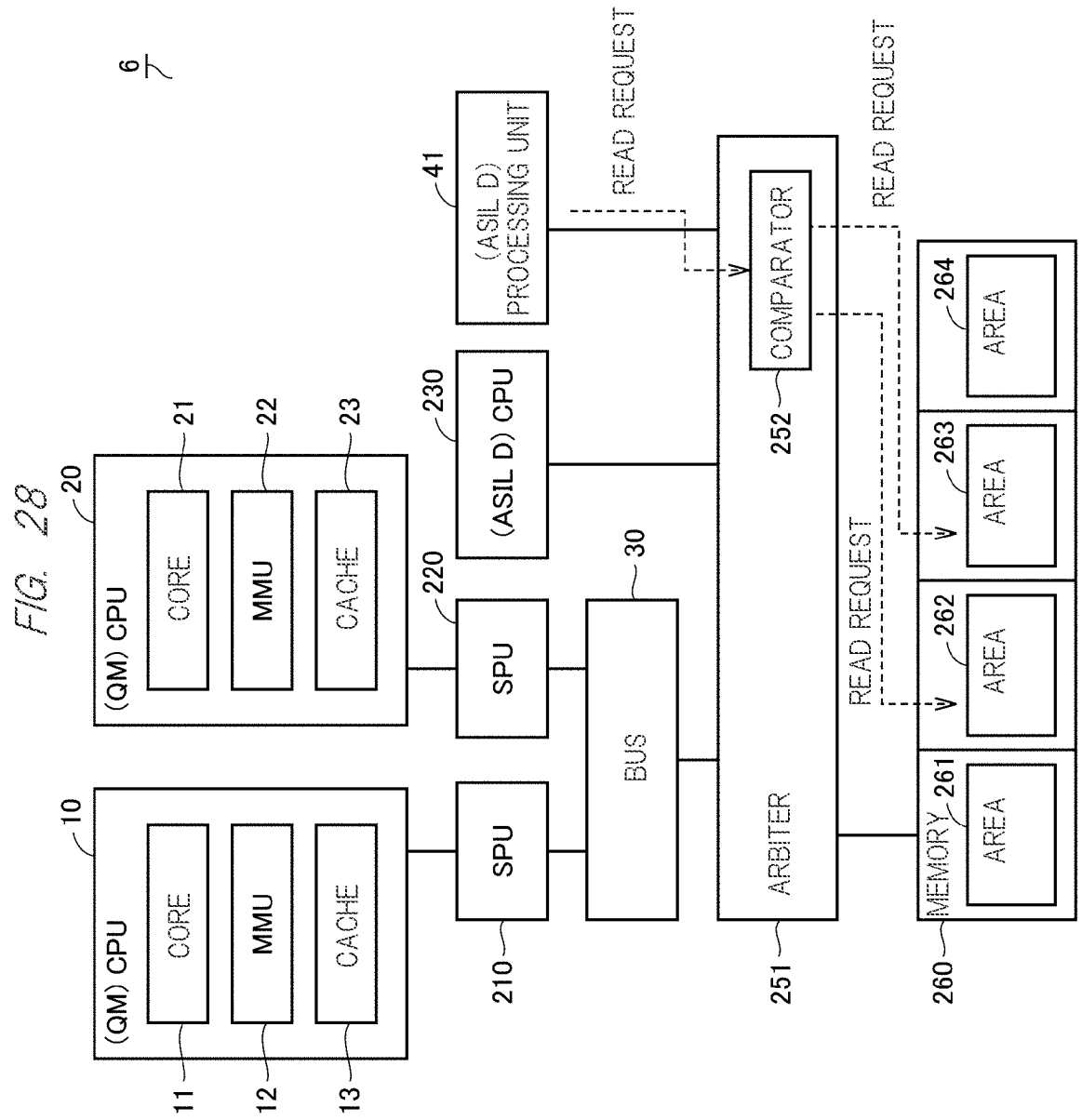
FIG. 28 is a diagram explaining reading of data stored in target areas.

FIG. 28 is a diagram for explaining reading of data stored in target areas. In one aspect, the processing unit 41 of the semiconductor device 6 transmits a read request to the comparator 252. The comparator 252 generates two read requests for accessing predetermined areas of the memory 260 from the received read request. Further, the comparator 252 accesses the area 262 (corresponding to the area 64) and the area 263 (corresponding to the area 65) based on the two generated read requests.

Figure 29:
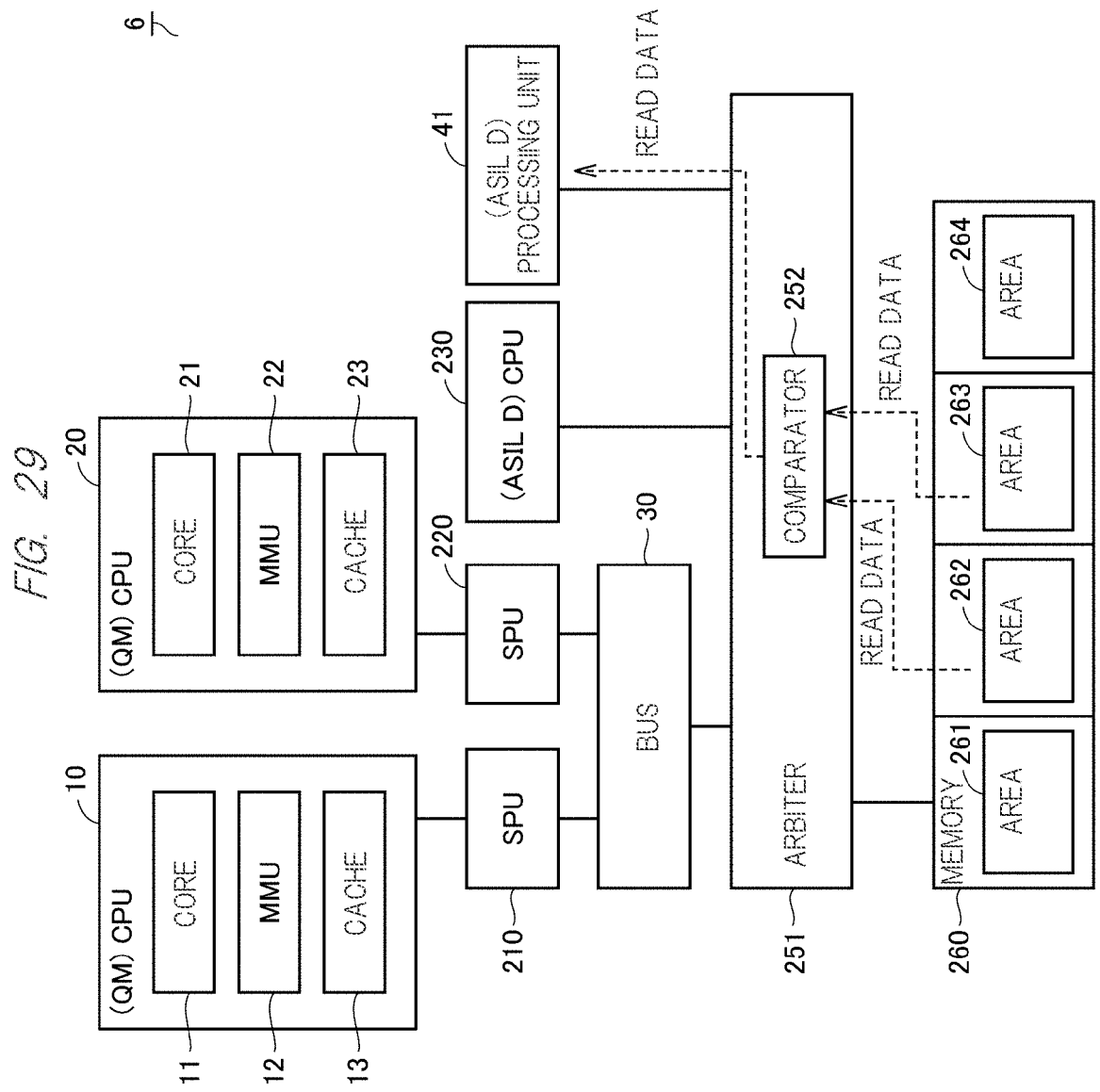
FIG. 29 is a diagram explaining an operation of comparison by a comparator 252.

FIG. 29 is a diagram for explaining the operation of comparison by the comparator 252. In one aspect, the comparator 252 performs comparison processing based on data read from the area 262 and data read from the area 263. In one aspect, the comparator 252 may compare the execution result of the program for the software lock-step by the CPU 10 with the execution result of the program for the software lock-step by the CPU 20. In another aspect, if one of the CPUs has generated a CRC from the execution result, the comparator 252 may read the CRC from the memory 260, generate a CRC from the execution result by the other CPU, and compare the read CRC with the generated CRC. The comparator 252 sends the execution result to the processing unit 41 after determines that the CRCs coincide with each other.

As described above, according to the present embodiment, the arbiter 250 includes the comparator 252. The comparator 252 accesses the memory 260, write and read data, whereby an amount of bandwidth used for accessing the memory 260 (two write+two read) can be reduced compared to an amount of bandwidth used for normal operation without performing the software lock-step (two write+two read), so it is possible to avoid a decrease in CPU resources due to the comparison process.

The above embodiment may be combined with the third embodiment. In this manner, the bandwidth of the memory can be substantially reduced by a factor of 1, and the processing unit 41 does not need to decode the CRC, thereby improving the processing speed.

Effect Of Embodiment

According to the software lock-step in each of the above-mentioned embodiments, the CPUs 10 and 20 where the functional safety level is the normal level execute processing in an application unit or a function unit without synchronizing with each other, and the CPU 230 supporting the ASIL D class compares the processing results. This eliminates need for reset processing or the like for synchronizing cores required for switching from a normal operation mode to a mode for performing the dual core lock-step, and eliminates an occurrence of a process stop time of several milliseconds.

In the above-described embodiments, examples of the ASIL D level or the ASIL B level are mainly used, but the technical idea according to the present disclosure can be applied to other functional safety levels, for example, the ASIL A level or the ASIL C level.

Although the invention made by the present inventors has been specifically described based on the embodiment, the present invention is not limited to the above embodiment, and needless to say, various changes may be made without departing from the scope thereof.

What is claimed is:

1. A semiconductor device comprising:
   a first Central Processing Unit (CPU) which includes a first cache and which operates in a first operation mode or a second operation mode;
   a second CPU which includes a second cache and that operates in the first operation mode or the second operation mode;
   a memory which includes a first region, a second region and a third region;
   a bus which is coupled to the memory;
   a first snoop control circuit which is coupled between the first CPU and the bus, and which controls a first snoop operation in which the first CPU accesses the second cache via the bus; and
   a second snoop control circuit which is coupled between the second CPU and the bus, and which controls a second snoop operation in which the second CPU accesses the first cache via the bus; and
   a controller which controls the first snoop control circuit and the second snoop control circuit,
   wherein the controller:
      permits the first snoop control circuit and the second snoop control circuit to perform the first snoop operation and the second snoop operation respectively, when the first CPU and the second CPU operate in the first operation mode; and
      prohibits the first snoop control circuit and the second snoop control circuit from performing the first snoop operation and the second snoop operation respectively, when the first CPU and the second CPU operate in the second operation mode,
   wherein the first CPU:
      accesses the second cache and the first region, when the first CPU operates in the first operation mode; and
      accesses the second region, when the first CPU operates in the second operation mode,
   wherein the second CPU:
      accesses the first cache and the first region, when the first CPU operates in the first operation mode; and
      accesses the third region, when the first CPU operates in the second operation mode,
   wherein the semiconductor device further comprises an arbiter which is coupled between the bus and the memory, and which provides address protection for the memory,
   wherein, when the first CPU and the second CPU operate in the first operation mode, the arbiter permits the first CPU and the second CPU to access the first region and prohibits the first CPU and the second CPU from accessing the second region and the third region, and
   wherein, when the first CPU and the second CPU operate in the second operation mode, the arbiter prohibits the first CPU and the second CPU from accessing the first region, permits the first CPU to access the second region, prohibits the second CPU from accessing the second region, prohibits the first CPU from accessing the third region and permits the second CPU to access the third region.

2. The semiconductor device according to claim 1, wherein the first snoop control circuit includes a first protection ON and OFF register for setting permission or prohibition of the first snoop operation, and
   wherein the second snoop control circuit includes a second protection ON and OFF register for setting permission or prohibition of the second snoop operation.

3. The semiconductor device according to claim 2, wherein the controller sets permission or prohibition of the first snoop operation in the first protection ON and OFF register, and sets permission or prohibition of the second snoop operation in the second protection ON and OFF register.

4. A control method of a semiconductor device which includes a first Central Processing Unit (CPU) which includes a first cache, a second CPU which includes a second cache, a memory which includes a first region, a second region and a third region, a bus which is coupled to the memory, a first snoop control circuit which is coupled between the first CPU and the bus and a second snoop control circuit which is coupled between the second CPU and the bus, and which is operable by switching between a first operation mode and a second operation mode, the control method comprising:

the semiconductor device operating in the first operation mode; and the semiconductor device operating in the second operation mode, wherein the operating in the first operation mode includes:
the controller setting, to the first snoop control circuit, permission of a first snoop operation in which the first CPU accesses the second cache via the bus;
the first CPU performing the first snoop operation;
the controller setting, to the second snoop control circuit, permission of a second snoop operation in which the second CPU accesses the first cache via the bus;
the second CPU performing the second snoop operation; and
the first CPU and the second CPU accessing the first region, wherein the operating in the second operation mode includes:
the controller setting prohibition of the first snoop operation to the first snoop control circuit;
the controller setting prohibition of the second snoop operation to the second snoop control circuit;
the first CPU accessing the second region; and
the second CPU accessing the third region, wherein the semiconductor device further includes an arbiter which is coupled between the bus and the memory, and which provides address protection for the memory, wherein the operating in the first operation mode further includes:
the arbiter permitting the first CPU and the second CPU to access the first region; and
the arbiter prohibiting the first CPU and the second CPU from accessing the second region and the third region;

wherein the operating in the second operation mode further includes:
the arbiter prohibiting the first CPU and the second CPU from accessing the first region;
the arbiter permitting the first CPU to access the second region;
the arbiter prohibiting the second CPU from accessing the second region;
the arbiter prohibiting the first CPU from accessing the third region; and
the arbiter permitting the second CPU to access the third region.

5. The control method of the semiconductor device according to claim 4,
wherein the first snoop control circuit includes a first protection ON and OFF register for setting permission or prohibition of the first snoop operation,
wherein the second snoop control circuit includes a second protection ON and OFF register for setting permission or prohibition of the second snoop operation,
wherein the setting of the permission of the first snoop operation includes setting the permission of the first snoop operation in the first protection ON and OFF register,
wherein the setting of the permission of the second snoop operation includes setting the permission of the second snoop operation in the second protection ON and OFF register,
wherein the setting of the prohibition of the first snoop operation includes setting the prohibition of the first snoop operation in the first protection ON and OFF register, and
wherein the setting of the prohibition of the second snoop operation includes setting the prohibition of the second snoop operation in the second protection ON and OFF register.

* * * * *